US011495269B2

(12) United States Patent
Morrison

(10) Patent No.: US 11,495,269 B2
(45) Date of Patent: Nov. 8, 2022

(54) WALL MOUNTED ISOLATING SYSTEM FOR DAMPENING VIBRATION

(71) Applicant: D Morrison Consulting Inc, Markham (CA)

(72) Inventor: David Morrison, Markham (CA)

(73) Assignee: D MORRISON CONSULTING INC

( * ) Notice: Subject to any disclaimer, the term of this patent is extended or adjusted under 35 U.S.C. 154(b) by 0 days.

(21) Appl. No.: 17/469,084

(22) Filed: Sep. 8, 2021

(65) Prior Publication Data
US 2022/0093137 A1 Mar. 24, 2022

Related U.S. Application Data

(60) Provisional application No. 63/082,466, filed on Sep. 23, 2020.

(51) Int. Cl.
*G11B 33/08* (2006.01)
*H04R 1/02* (2006.01)

(52) U.S. Cl.
CPC ............. *G11B 33/08* (2013.01); *H04R 1/026* (2013.01)

(58) Field of Classification Search
CPC ................................ G11B 33/08; H04R 1/026
See application file for complete search history.

(56) References Cited

U.S. PATENT DOCUMENTS

| 785,571 | A | 3/1905 | Raines et al. |
|---|---|---|---|
| 1,273,939 | A | 7/1918 | Sidel |
| 2,933,850 | A | 4/1960 | Martin |
| 2,956,368 | A | 10/1960 | Klein |
| 3,784,146 | A | 1/1974 | Matthews |
| 4,011,821 | A | 3/1977 | Neal |
| D247,035 | S | 1/1978 | Brodmann |
| 2,947,587 | A | 8/1980 | Navellier |
| 4,493,471 | A | 1/1985 | McInnis |
| D286,149 | S | 10/1986 | Tucker |
| D290,254 | S | 6/1987 | Arevalo |
| D290,953 | S | 7/1987 | Sklaar et al. |
| 4,687,173 | A | 8/1987 | Genna |
| 4,722,154 | A | 2/1988 | Virta et al. |

(Continued)

FOREIGN PATENT DOCUMENTS

JP 2014128000 7/2014

*Primary Examiner* — Andrew L Sniezek
(74) *Attorney, Agent, or Firm* — Sand, Sebolt & Wernow Co., LPA

(57) ABSTRACT

An isolating system for dampening vibrations to or from audio equipment includes a mounting bracket secured to a support surface and a lower isolator assembly engaged with the mounting bracket. An upper isolator assembly engages the audio equipment and is positioned above the lower isolator assembly. The upper and lower assemblies are engaged with one another via aligned pairs of resilient, vibration-dampening isolators and associated connector members. The connector members extend between the isolators and are long enough to prevent direct contact between the upper and lower isolators. The isolating system is configured to allow a user to pivot the audio equipment about a vertical axis to change the position of the equipment in a horizontal plane. The isolating system is further configured to allow the user to pivot the audio equipment about a horizontal axis to change the position of the equipment in a vertical plane.

20 Claims, 30 Drawing Sheets

(56) References Cited

U.S. PATENT DOCUMENTS

| | | |
|---|---|---|
| 4,948,076 A | 8/1990 | Sumrell et al. |
| 5,169,104 A | 12/1992 | Kwoh |
| 5,201,896 A * | 4/1993 | Kruszewski ............ F16M 11/10 248/278.1 |
| 5,570,867 A | 11/1996 | Norkus |
| D401,424 S | 11/1998 | Ogo et al. |
| 58,816,533 | 3/1999 | Pfister |
| 5,915,662 A | 6/1999 | Itakura et al. |
| 6,024,338 A | 2/2000 | Koike et al. |
| 6,155,530 A | 12/2000 | Borgen |
| 6,247,414 B1 | 6/2001 | Sikora et al. |
| 6,296,238 B1 | 10/2001 | Lund-Andersen |
| 6,357,717 B1 | 3/2002 | Kennard, IV |
| 6,648,295 B2 | 11/2003 | Herren et al. |
| 6,895,870 B1 | 5/2005 | Bizlewicz |
| 6,976,434 B2 | 12/2005 | Roig et al. |
| D571,779 S | 6/2008 | Matsuoka |
| D581,698 S | 12/2008 | Fix |
| 7,640,868 B2 | 1/2010 | Morrison et al. |
| 8,215,245 B2 | 7/2012 | Morrison |
| D723,308 S | 3/2015 | Franck et al. |
| D730,089 S | 5/2015 | Carbone |
| D741,840 S | 10/2015 | Morrison |
| 2006/0006307 A1 | 1/2006 | Mogilever |
| 2010/0059651 A1 * | 3/2010 | Morrison .............. F16F 1/3732 248/562 |
| 2013/0206499 A1 | 8/2013 | Maruyama et al. |

\* cited by examiner

WALL MOUNTED ISOLATING SYSTEM FOR DAMPENING VIBRATION

CROSS-REFERENCE TO RELATED APPLICATIONS

This application claims the benefit of U.S. Provisional Patent Application Ser. No. 63/082,466, filed Sep. 23, 2020, the entire disclosure of which is incorporated herein by reference.

TECHNICAL FIELD

This disclosure relates generally to equipment that generates vibration and/or is sensitive to vibration, such as audio equipment. More particularly the disclosure relates to a system and method for dampening vibrations in audio equipment. Specifically, the disclosure is directed to an isolating system useful for securing audio equipment to a support surface such as a wall or ceiling, and which includes upper and lower isolator assemblies that dampen vibrations. The isolating system allows the audio equipment to be moved through one or both of a horizontal plane and a vertical plane so that sound quality from the audio equipment is optimized.

BACKGROUND

Background Information

The performance of audio equipment such as speakers, turntables, amplifiers, tuners and so on is greatly affected by the manner in which this audio equipment is engaged with supporting surface or structure. The vibration in a speaker cabinet, for example, may be transferred into a supporting structure for the cabinet and will tend to excite the supporting structure or surface and cause it to radiate acoustic energy and dissonant sounds. The vibration in the speaker cabinet may also travel through the structure to excite other audio components, causing acoustic anomalies in the listening space, or the vibration may be conducted into other spaces and disturb the occupants of those other spaces. The vibration in the speaker cabinet may also be reflected and conducted back into the speaker cabinet via the connecting assembly, causing a reduction in clarity and a perceived collapse of the stereo image in two-channel or multi-channel systems.

Audio equipment, such as speakers, needs to be fixed in position as any displacement caused by internal forces, such as the travel of the speaker cone, or caused by external forces, such as impact to the supporting structure, may cause disturbance and losses in the acoustic results.

Additionally, the audio equipment's performance and the perceived acoustic results are affected by the audio equipment's location in any particular environment and the equipment's angle of dispersion in both a horizontal and a vertical plane.

SUMMARY

The present disclosure is directed to an isolating system that is used to affix vibration-generating or vibration-sensitive equipment to a support surface in such a manner as to enable desired acoustic results to be obtained. Any vibration-generating or vibration-sensitive equipment that may be affixed to a support surface by the isolating system of the present disclosure will generally be referred to herein by the term "audio equipment". The term should not be construed as narrowly representing only a specific type of equipment such as an audio speaker, although an audio speaker is one type of equipment that may be mounted on a support surface with the disclosed isolating system. In one embodiment, the isolating system of the present disclosure is utilized to fix audio equipment to a vertical or inclined support surface such as a wall. In another embodiment, the isolating system of the present disclosure is utilized to fix audio equipment to a horizontal support surface such as a ceiling. Both the wall mounted isolating system and the ceiling mounted isolating system enable the audio equipment to be adjusted in both a horizontal plane and a vertical plane so that the best perceived acoustic results are obtained from that audio equipment. The isolating system disclosed herein addresses the aforementioned requirements at a relatively low cost to the consumer.

The basic construction of an isolating system in accordance with the present disclosure includes a mounting bracket, a lower isolator assembly that is engaged with the mounting bracket, and an upper isolator assembly that is operatively engaged with the lower isolator assembly and with the audio equipment. The mounting bracket, the lower isolator assembly, and upper isolator assembly may be fabricated from any suitable material. Some suitable materials include, but are not limited to Acrylonitrile Butadiene Styrene (ABS) plastic, any other plastic, composite materials, metals or any combination of such materials. The specific material selected will depend on the overall weight of the speaker or other audio equipment that the isolating system is to hold. If the speaker or audio equipment is relatively light, at least some of the components of the isolating system will be comprised of ABS plastic or some similar material. The overall dimensions (i.e., length, height, and width) of the isolating system are also scaled to suit the shape, size, and weight of the speaker or other audio equipment that the isolating system is to support.

The lower isolator assembly is connected via a mounting bracket to a supporting structure such as a wall, a ceiling, an overhead grid system, or to a floor stand. The lower isolator assembly includes one or more molded resilient isolators affixed in the assembly. The resilient isolators may be fabricated from materials such as rubber or rubber-like materials. Each isolator used in the lower isolator assembly defines an opening in an upper end thereof. The upper isolator assembly is positioned above the lower isolator assembly and includes a support arm that extends below the lower isolator assembly to connect with the speaker or audio equipment. When the speaker or audio equipment is secured to the support arm, the upper isolator assembly bears the entire weight of the speaker or audio equipment. Isolators are captive in the upper isolator assembly with openings defined on the lower side of the isolators. Connector members such as tubes or rods are pressed into the openings defined in the isolators of the lower isolator assembly and into the openings defined in the isolators of the upper isolator assembly. The upper isolator assembly is pressed downwardly onto these connector members until no further movement is possible. The connector members are sufficiently long enough to ensure that the upper isolators do not come into direct contact with the lower isolators, even when a maximum design weight is applied to the isolating system.

The isolators of the lower isolator assembly and upper isolator assembly have multiple functions. The ends of the connector members engage the isolators to dampen vertical vibrations while the interference fit of the connector members into the isolator openings provides dampening of the horizontal vibrations while resisting lateral deflection. The upper isolator assembly and lower isolator assembly, together, may be configured to house one or more aligned pairs of upper and lower isolators and the associated connector members. The number of pairs of upper and lower isolators and associated connector members will be provided in the isolating system depending upon the application and the designed weight capacity required to support different sizes and types of audio equipment.

The present disclosure therefore relates to an isolating system for dampening vibrations from audio equipment and includes a mounting bracket which secures the isolating system to a support surface, particularly a surface located a distance above the ground. (The support surface may be a wall or a ceiling.) The isolating system includes a lower isolator assembly operatively engaged with the mounting bracket and an upper isolator assembly operatively engaged with the lower isolator assembly. The lower and upper isolator assemblies each include at least one resilient vibration-dampening isolator and the isolators of the upper and lower isolator assemblies are operatively engaged with one another via connector members such as tubes or rods. The isolating system is configured to allow a user to pivot the audio equipment about a vertical axis to change the position of the equipment in a horizontal plane. The isolator assembly is further configured to allow the user to pivot the audio equipment about a horizontal axis to change the position of the equipment in a vertical plane.

In one aspect, an exemplary embodiment of the present disclosure may provide an isolating system for dampening vibrations to or from audio equipment, said isolating system comprising a lower isolator assembly adapted to be operatively engaged with a support surface; an upper isolator assembly located vertically above the lower isolator assembly, wherein the upper isolator assembly is adapted to be operatively engaged with the audio equipment and to bear the audio equipment's weight; at least one first isolator provided in the lower isolator assembly; at least one second isolator provided in the upper isolator assembly; wherein the at least one first isolator and the at least one second isolator are fabricated from a vibration-dampening material; and at least connector member extends between the at least one first isolator and the at least upper isolator, wherein the at least one connector member is an only point of contact between the lower isolator assembly and the upper isolator assembly.

In one embodiment, the at least one connector member may be of a length sufficient to prevent direct contact between the at least one first isolator and the at least one second isolator. In one embodiment, the vibration-dampening material of the at least one first isolator and the at least one second isolator may be a resilient material. In one embodiment, the isolating system may include a mounting bracket adapted to be secured to the support surface; and the lower isolator assembly may be operatively engaged with the mounting bracket. In one embodiment, the lower isolator assembly may be pivotally secured to the mounting bracket, and the lower isolator assembly and upper isolator assembly may be configured to pivot in unison about a pivot axis. In one embodiment, the pivot axis may be vertically-oriented and the lower isolator assembly, the upper isolator assembly, and the audio equipment engaged therewith may be pivotable in a horizontal plane about the pivot axis. In one embodiment, the upper isolator assembly may include a tilt assembly adapted to operatively engage the audio equipment to the upper isolator assembly. In one embodiment, the tilt assembly may include a tilt axis, and wherein the audio equipment may be pivotable relative to the upper isolator assembly about the tilt axis. In one embodiment, the tilt axis is horizontally-oriented and the tilt assembly may be operable to pivot the audio equipment in a vertical plane about the tilt axis. In one embodiment, the upper isolator assembly may be configured to support the audio equipment's weight directly under the lower isolator assembly.

In another aspect, an exemplary embodiment of the present disclosure may provide a method of reducing transfer of vibration between audio equipment and a support surface comprising providing an isolating system having a lower isolator assembly and upper isolator assembly, wherein an only point of contact between the lower isolator assembly and the upper isolator assembly is via a connector member extending between a resilient upper isolator in the upper isolator assembly and a resilient lower isolator in the lower isolator assembly; operatively engaging the lower isolator assembly to the support surface; operatively engaging the audio equipment to the upper isolator assembly; and dampening vibration to or from the audio equipment with the resilient upper isolator of the upper isolator assembly and the resilient lower isolator of the lower isolator assembly.

In one embodiment, engaging the lower isolator assembly with the support surface may include engaging the lower isolator assembly to a mounting bracket and securing the mounting bracket to the support surface. In one embodiment, engaging the lower isolator assembly to the mounting bracket may comprise pivotally connecting the lower isolator assembly to the mounting bracket. In one embodiment, the method may further comprise pivoting the lower isolator assembly and upper isolator assembly in unison about a vertically-oriented pivot axis, and moving the audio equipment through a horizontal plane. In one embodiment, the method may further comprise engaging a tilt assembly with the upper isolator assembly; and pivotally connecting the audio equipment to the tilt assembly. In one embodiment, the method may further comprise pivoting the audio equipment about a horizontally-oriented pivot axis; and moving the audio equipment through a vertical plane. In one embodiment, the method may further comprise suspending the audio equipment from the upper isolator assembly. In one embodiment, the method may further comprise connecting the audio equipment to the upper isolator assembly at a location vertically below the lower isolator assembly. In one embodiment, the audio equipment has a weight, and the method may further comprise bearing the weight of the audio equipment with the upper isolator assembly. In one embodiment, the method may further comprise providing a support arm on the upper isolator assembly; defining an aperture in the lower isolator assembly; receiving the support arm through the aperture; dimensioning the support arm relative to the aperture such that no contact is made between the support arm and the lower isolator assembly when the support arm is received through the aperture; and securing the audio equipment to the support arm a distance below the lower isolator assembly.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure.

It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1:
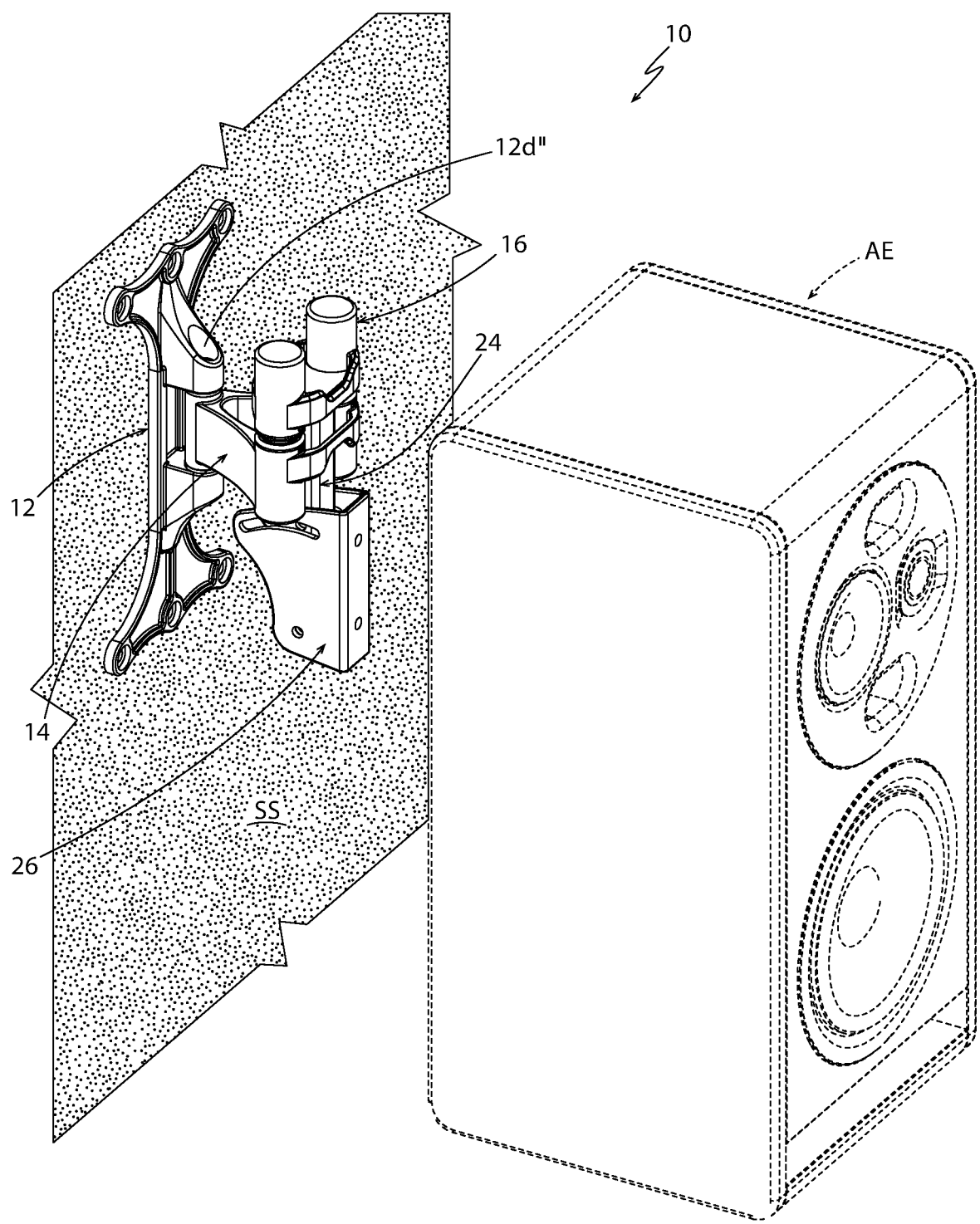
FIG. 1 is a left side, top, front perspective view of a first embodiment of an isolating system in accordance with the present disclosure, shown mounted on a wall and illustrating audio equipment, in phantom, ready for engagement with the isolating system.

FIGS. 1 through 7 show a first embodiment of an isolating system in accordance with the present disclosure generally indicated at 10. Isolating system 10 is configured to be secured to a support surface "SS" such as a flat wall that may be vertically oriented or inclined at an angle to the vertical. Isolating system 10 is further configured to suspend audio equipment "AE" on support surface "SS" a distance vertically above a remote horizontal surface such as a floor. FIG. 1 shows an audio speaker positioned ready for engagement with isolating system 10. The audio speaker is exemplary of one type of audio equipment "AE" that may be mounted on a support surface "SS" by isolating system but it should be understood that a wide variety of other desired types of audio equipment "AE" may be mounted on support surface "SS" by isolating system 10. The isolating system 10 bears the weight of audio equipment "AE", dampens vibrations from the audio equipment "AE", and thereby substantially prevents vibrations from being transmitted to the support surface "SS". This arrangement improves the sound quality of the audio equipment "AE".

Figure 3:
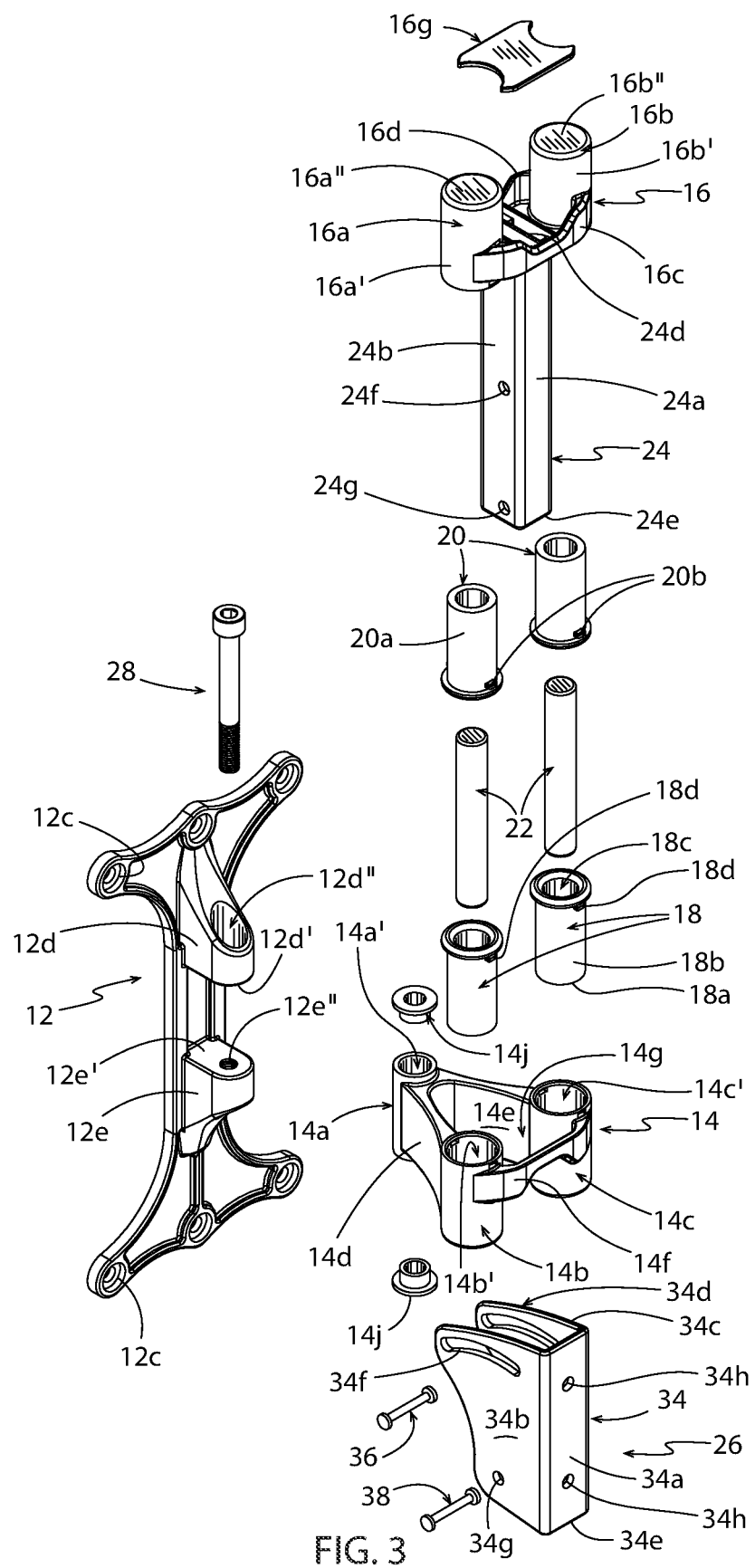
FIG. 3 is an exploded left side, top, front perspective view of the isolating system of FIG. 2.

Referring to FIG. 3, isolating system 10 comprises a mounting bracket 12, a lower isolator assembly 14, and an upper isolator assembly 16. Lower isolator assembly 14 includes first isolators 18 and upper isolator assembly 16 includes second isolators 20. The first isolators 18 and second isolators 20 are fabricated from a resilient material that is capable of dampening vibrations. One suitable material for this purpose is rubber. Each first isolator 18 is arranged within lower isolator assembly 14 to vertically align with one of the second isolators 20 arranged within upper isolator assembly 16. A connector member 22 extends between each aligned pair of a first isolator 18 and a second isolator 20. Isolating system 10 further includes a support arm 24 and a tilt assembly 26. All of these components and their interactions with one another will be described in greater detail hereafter.

Mounting plate 12, first isolator assembly 14 and second isolator assembly 16 are all cast components. It will be understood, however, that in other instances, one or more of mounting plate 12, first isolator assembly 14 and second isolator assembly 16 may be fabricated in a different way other than casting.

Mounting bracket 12, as illustrated, is a stylized "I-shape" in configuration but it will be understood that any mounting bracket may have any other desired decorative configuration. Mounting bracket 12 comprises a plate having a front surface 12a, a rear surface 12b (FIG. 5), and a plurality of holes 12c for receiving fasteners therethrough in order to secure mounting bracket 12 to a support structure such as support surface "SS" (FIG. 1). Mounting bracket 12 further includes a first support 12d and a second support 12e that extend outwardly from front surface 12a. First support 12d and a second support 12e are cast with the plate so that they are integral therewith and are also of a stylized design. First and second supports 12d, 12e are vertically spaced a distance apart from one another such that a gap is defined between a lower surface 12d' of first support 12d and an upper surface 12e' of second support 12e. This gap can be readily seen in FIG. 5 and is indicated by reference character 12f.

Figure 2:
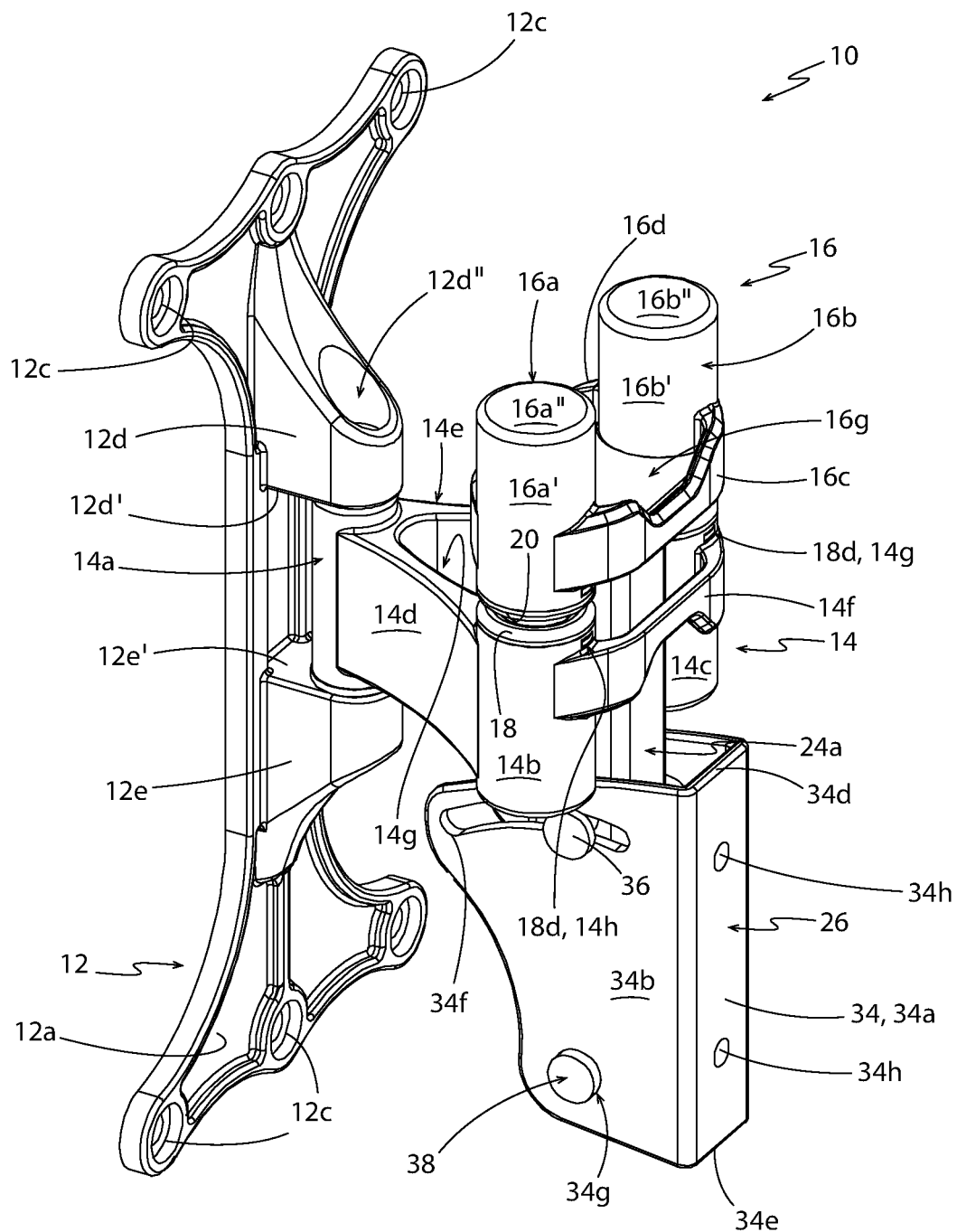
FIG. 2 is a left side, top, front perspective view of the isolating system of FIG. 1 in accordance with the present disclosure and shown in isolation.
Figure 7:
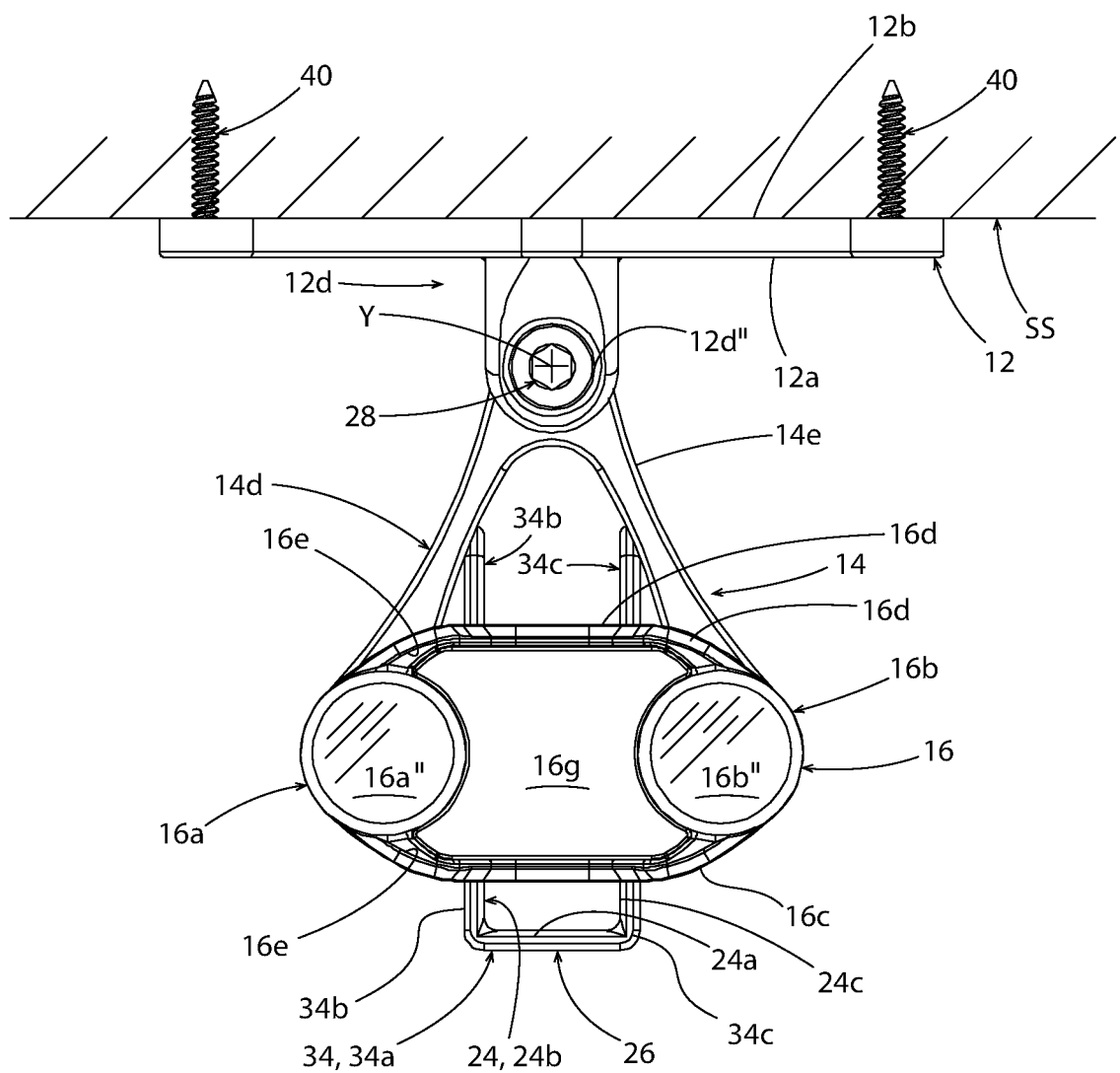
FIG. 7 is a top plan view of the isolating system of FIG. 2.

As best seen in FIGS. 2, 3, and 7, first support 12d defines a through-hole 12d" therein that extends from an upper surface (not numbered) of first support 12d through to the lower surface 12d' thereof. Second support 12e defines an aperture 12e" therein that extends inwardly for a distance from upper surface 12e' of second support 12e through to a lower surface (not numbered) thereof. Aperture 12e' is threaded. Through-hole 12d" and aperture 12e" are vertically aligned with one another.

Lower isolator assembly 14 comprises a cast housing which is generally triangular in shape when viewed from above and include a hub 14a, a first tubular member 14b, and a second tubular member 14c. Hub 14a, first tubular member 14b, and second tubular member 14c are arranged at the vertices of the triangularly-shaped cast housing. First tubular member 14b is connected to hub 14a by a first leg 14d; second tubular member 14c is connected to hub by a second leg 14e, and first and second tubular members 14b, 14c are connected to one another by a crossbar 14f. The hub 14a, first leg 14d, first tubular member 14b, crossbar 14f, second tubular member 14c, and second leg 14e bound and define a central opening 14g that extends from a top region of the cast housing to a bottom region thereof.

Hub 14a defines a through-hole 14a' that extends from an opening defined in a top region of the hub to an opening defined in a bottom region of the hub. Hub 14a is used to secure lower isolator assembly 14 to mounting bracket 12. Bushings 14j are inserted into the openings at either end of through-hole 14a' and a hole (not numbered) in each bushing 14j aligns with the through-hole 14a' of hub 14a. Hub 14a, with engaged bushings 14j, is sized to be received within the gap 12f defined between first support 12d and second support 12e. When hub 14a is so received within gap 12f, the through-hole 14a' of hub 14a is vertically aligned with through-holes 12d" of first support 12d on mounting bracket 12, with the bores extending through bushings 14j, and with aperture 12e" defined in second support 12e on mounting bracket 12. Once the through-holes 12d", 14a", 14j, and aperture 12e" are all aligned with one another, the pivot rod 28 is inserted into therethrough. Pivot rod 28 is rotated to threadedly engage within the threaded aperture 12e" and is rotated until lower isolator assembly 14 is securely engaged with mounting bracket 12.

First tubular member 14b includes a sidewall 14b' and a bottom wall 14b". The sidewall 14b' extends upwardly and outwardly away from bottom wall 14b". First tubular member 14b also defines a bore 14b'" therein that originates in an opening defined in an upper end of the first tubular member 14b and extends inwardly and downwardly therefrom. Similarly, second tubular member 14c includes a sidewall 14c' and a bottom wall 14c". The sidewall 14c' extends upwardly and outwardly away from bottom wall 14c". Second tubular member 14c also defines a bore 14c'" therein that originates in an opening defined in an upper end of the second tubular member 14c and extends inwardly and downwardly therefrom.

As indicated earlier herein, a first isolator 18 is received within each of the bores 14b'" and 14c'" of first tubular member 14b and second tubular member 14c. The interior configuration of the first tubular member 14b, second tubular member 14c, and first isolators 18 is shown in greater detail in FIG. 8. Each first isolator 18 includes a bottom wall 18a and a cylindrical sidewall 18b that extends upwardly and outwardly away from bottom wall 18a. A central recess 18c is defined in each first isolator 18. The central recess 18c extends downwardly from an opening defined in an upper end of the first isolator 18 that is remote from bottom wall 18b thereof. Central recess 18c terminates a distance inwardly from bottom wall 18a. In some embodiments, bottom wall 18a of first isolator 18 may be concavely curved. When first isolator 18 is received within the bore 14b'" of first tubular member 14b or within the bore 14c'" of second tubular member 14c, a portion of bottom wall 18a of first isolator 18 will rest on the bottom wall 14b" of first tubular member 14b or on the bottom wall 14c" of second tubular member 14c. In some embodiments, a dome-shaped space 31 may be defined between bottom wall 18a of first isolator 18 and bottom wall 14b" of first tubular member 14b and between bottom wall 18a of first isolator and bottom wall 14c" of second tubular member 14c".

Figure 8:
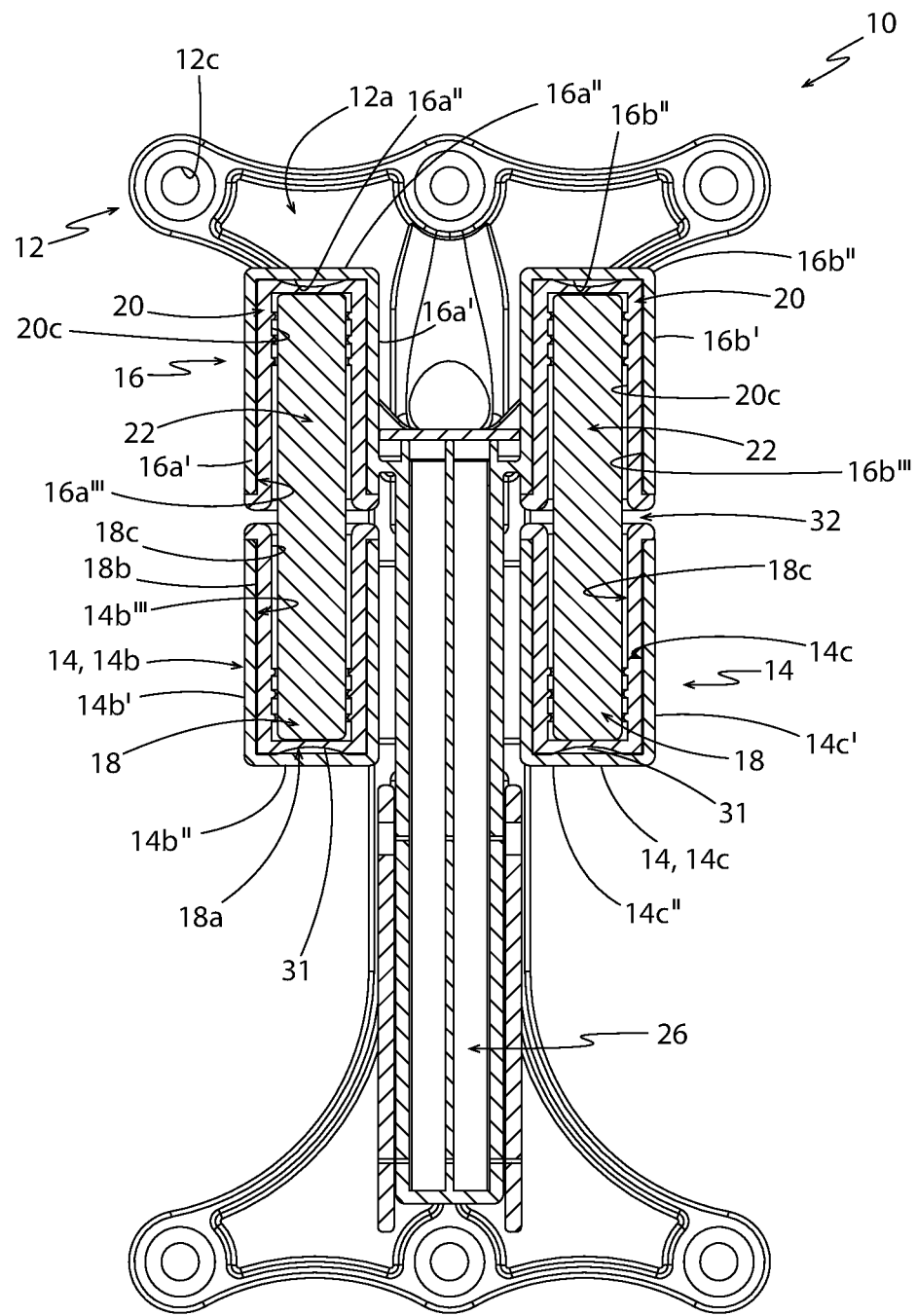
FIG. 8 is a vertical cross-section of the isolating system taken along line 8-8 of FIG. 5.

FIG. 8 also shows that first isolator 18 is longer than the bore 14b'" or 14c'" of the first tubular member 14b or second tubular member 14c within which first isolator 18 is received. As a consequence an upper region of first isolator 18 extends above an upper end of the associated first tubular member 14b or second tubular member 14c. The circumference of each first isolator 18 may be slightly greater than the circumference of the associated bore 14b'", 14c'" within which first isolator 18 is received. First isolator 18 is press-fitted into the associated bore 14b'", 14c'" and is therefore retained therein by an interference fit between the first isolator 18 and the first tubular member 14b. First isolators 18 extend for a short distance upwardly from an upper surface of first tubular member 14b and second tubular member 14b of lower isolator assembly 14a and toward upper isolator assembly 16.

As best seen in FIG. 3, each of the first isolators 18 includes at least one tab 18d that extends radially outwardly from an exterior surface of sidewall 18b. Each tab 18d of first isolator 18 is shaped and sized to be received in a complementary slot 14h defined in one of first tubular member 14b or second tubular member 14c. One tab 18 is shown in FIG. 3 but it will be understood that an identical tab may be provided on an opposite surface of first isolator 18 from the tab 18 visible in FIG. 3. It will be understood that tabs 18 may be provided at any desired locations on first isolator 18. At least one slot 14h is defined a short distance downwardly from an uppermost edge (not numbered) of the associated first and second tubular member 14b, 14c. The number of slots 14h defined in the associated first and second tubular member 14b, 14c is complementary to the number, location, and orientation of tabs 18d provided on first isolator 18 or vice versa. When first isolator 18 is to be press-fitted into the bore 14b''' or 14c''' of the associated tubular member 14b or 14c, the user (or the factory) will rotate the first isolator 18 within bore 14b''' or 14c''' so that the at least one tab 18d will ultimately be aligned with the at least one slot 14h defined in the first or second isolator 14b, 14c. As first isolator 18 is pushed downwardly into the associated bore 14b''', 14c''', each tab 18d will be depressed inwardly as the flexible, resilient material from which first isolator 18 is fabricated deflects inwardly. When tab 18d moves into alignment with the associated slot 14h, the material of first isolator 18 returns to its original, non-deflected condition and tab 18d moves through slot 14h, locking first isolator 18 in engagement with the associated first tubular member 14b or second tubular member 14c.

Referring to FIGS. 3 and 7, upper isolator assembly 16 comprises a cast housing which includes a first cylindrical member 16a and a second cylindrical member 16b that are laterally aligned with one another. The lateral distance between first cylindrical member 16a and second cylindrical member is complementary to the lateral spacing between first tubular member 14b and second tubular member 14c of lower isolator assembly 16. A first crossbar 16c extends between a front surface of first cylindrical member 16a and a front surface of second cylindrical member 16b. Similarly, a second crossbar 16d extends between a rear surface of first cylindrical member 16a and a rear surface of second cylindrical member 16b.

First cylindrical member 16a and second cylindrical member 16b may be substantially identical to first tubular member 16b and second tubular member 16c. Each of the first and second cylindrical members includes a sidewall 16a' or 16b', respectively, and an associated top wall 16a'', 16b''. Sidewall 16a', 16b' extends outwardly and downwardly from the respective top wall 16a'', 16b''. First cylindrical member 16a and second cylindrical member 16b each define a bore 16a''', 16b''' (FIG. 8), respectively, therein. The bores 16a''' 16b''' originate in an opening in a lower end of the associated first cylindrical member 16a and second cylindrical member 16b and extend inwardly and upwardly therefrom. When isolating system 10 is assembled, upper isolator assembly 16 is positioned such that the openings to the bores 16a''', 16b''' of the first and second cylindrical members 16a, 16b are vertically aligned with the bores 14b''', 14c''' of the first and second tubular members 14b, 14c, respectively.

As indicated earlier herein, isolating system 10 further includes a pair of second isolators 20. Each second isolator 20 is substantially identical in structure and function to the first isolators 18 and therefore will not be described in any detail herein other than to say that each second isolator 20 has a sidewall 20a (FIG. 3) from which one or more tabs 20b extend. Second isolator 20 also a bore 20c (FIG. 8) therein that is substantially similar to the bore 18c defined in first isolator 18. The one or more tabs 20b that extend outwardly from an exterior surface of the isolator's sidewall 20a are similar to tab 18d of first isolator 18.

Figure 6:
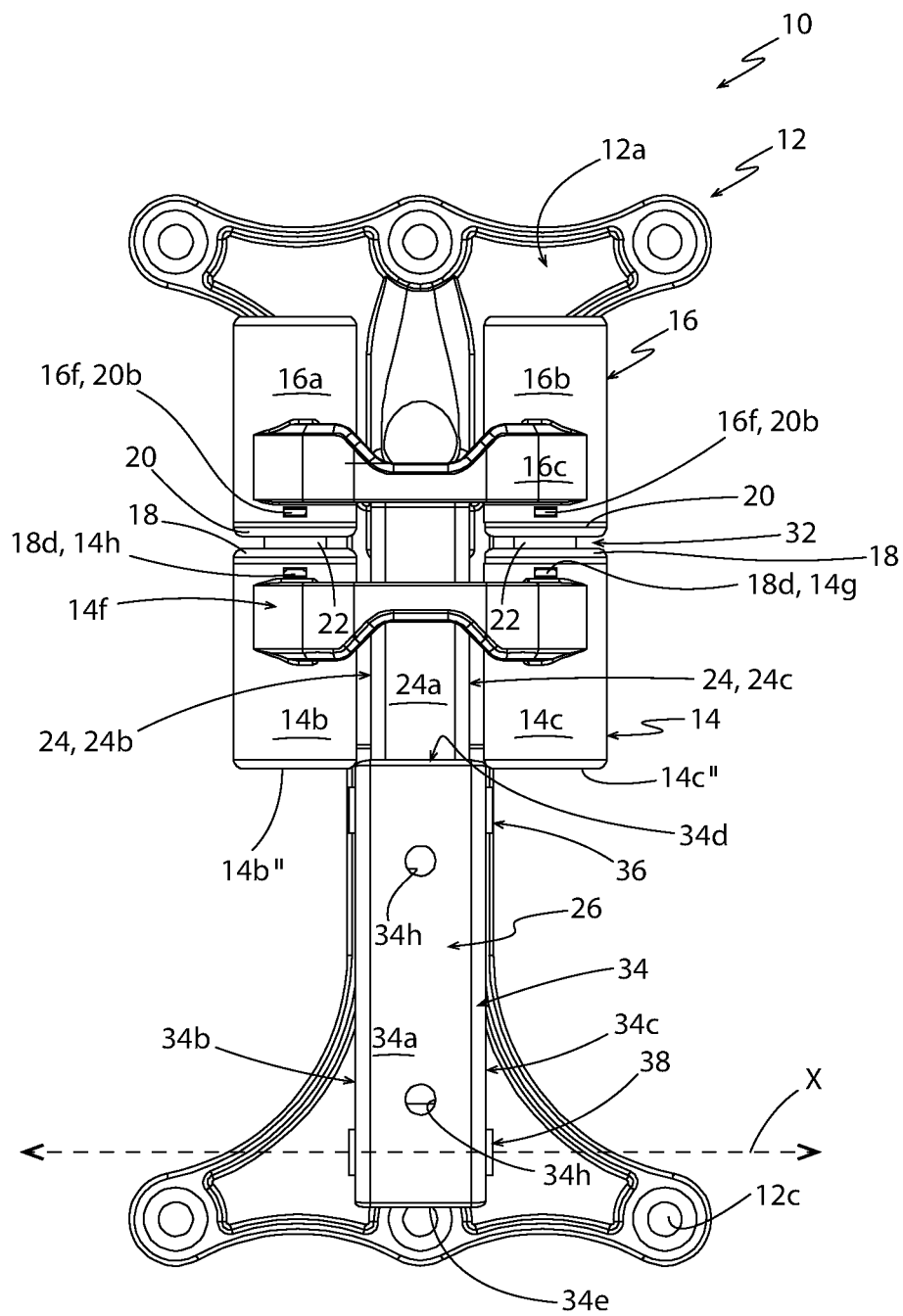
FIG. 6 is a front elevation view of the isolating system of FIG. 2.

Each second isolator 20 is press-fittingly engaged in one of the first cylindrical member 16a and second cylindrical member 16b. The sidewall 16a', 16b' of the associated first or second cylindrical members 16a, 16b defines a hole 16f therein which is substantially identical in structure and function to the slot 14h defined in each of the sidewalls 14b', 14c' of the associated first or second tubular members 14b, 14c. The tab 20b on each second isolator 20 is complementary in location, shape, and size to hole 16f (FIG. 6). When second isolators 20 are engaged with upper isolator assembly 16, second isolator 20 is oriented so that the tab 20b thereon is generally aligned with the hole 16f in the respective one of the first and second cylindrical members 16a, 16b. Second isolator 20 is inserted into the bore 16a''', 16b''' of the associated first and second cylindrical member 16a, 16b, and is pushed inwardly until the tab 20b extends through the associated hole 16f. A portion of the second isolator 20 extends outwardly beyond a lower rim of the associated one of the first cylindrical member 16a and second cylindrical member 16b in a similar way to how a portion of each first isolator 18 extends above the upper rim of the associated first tubular member 14b or second tubular member 14c.

It will be understood that the engagement of the tabs 18d, 20b on the isolators 18, 20 in the associated holes 14g and 16f of the tubular or cylindrical members helps to keep isolators 18, 20 in rotational alignment and aids in preventing the first and second isolators 18, 20 from being accidentally removed from the bores of the associated tubular or cylindrical members.

As shown in FIG. 3, isolating system 10 further includes two connector members 22. The term "connector member" is used herein to describe a structure that is of either a solid construction or is hollow from an upper end to a lower end thereof. The connector members may be cylindrical with a bore extending from an opening in the upper end to an opening in the lower end, or the upper and lower ends may be closed off. It will be understood that the connector members 22 may be of any desired cross-sectional shape that suits a particular application in which the connector members are to be used. For example, the connector members may be circular in cross-section or oval or rectangular, or hexagonal, or irregular, or of any configuration that suits the application in which isolating system 10 is to be used.

The connector members 22 extend between the lower isolator assembly 14 and the upper isolator assembly 16. In particular, each connector member 22 extends between the bore 18c of one of the first isolators 18 and the bore 20c of a second isolator 20 that is vertically aligned with the one of the first isolators 18. The connector members 22 and bores 18c, 20c are configured to be complementary to one another in some embodiments. So, for example, the bores 18c, 20c may be cylindrical in shape (i.e., circular in cross-section) and the associated connector members 22 are similarly cylindrical in shape (i.e., circular in cross-section). In other embodiments, the bores 18c, 20c may be rectangular cuboids in shape (i.e., rectangular or square in cross-section) and the connector members 22 will be complementary in cross-section. In yet other embodiments, the bores 18c, 20c may be triangular in cross-section, or elliptical, or hexagonal, or of any other desired cross-sectional confirmation and the connector members 22 will be configured to be complementary thereto. Isolators 18, 20 are shaped to resist lateral movement or deflection and keep everything in alignment and on-axis with a direction of movement of transducers provided in the audio equipment "AE" that is engaged with isolator system 10.

It will be understood that in other embodiments the cross-sectional shape of the connector members 22 and bores 18c, 20c may be dissimilar. For example, in some embodiments the bores 18c, 20c may be oval in shape and the connector members 22 may be circular in cross-section. The configuration of the connector members 22 relative to the bores 18c, 20c will be based on the particular application in which the isolator system 10 is to be utilized.

As shown in FIG. 8, The ends of connector members 22 are inserted into the opposed bores 18c, 20c of first and second isolators 18, 20 and are of a sufficient length to prevent upper isolator assembly 16 and lower isolator assembly 14 from directly contacting one another. In particular, connector members 22 are of a length that exceeds the combined depths of the bore 18c of a first isolator 18 and the depth of the bore 20c of a second isolator 20 vertically aligned with the first isolator 18. As a result, when the isolating system 10 is assembled (as described later herein), a gap 32 (FIG. 6) is defined between an uppermost surface of first isolator 18 and a lowermost surface of the second isolator 20 aligned therewith. The purpose of gap 32 will be described later herein.

Referring to FIGS. 3, 6, and 7 upper isolator assembly 16 further includes a support arm 24 that is generally rectangular in cross-section. Support arm 24 is cast as part of upper isolator assembly 16 and includes a front wall 24a and rear wall (not shown), and a pair of sidewalls 24b, 24c extending between the front wall 24a and rear wall. Support arm 24 has a first end 24d and a remote second end 24e. Support arm 24 extends downwardly for a distance below the lower ends of the first cylindrical member 16a and second cylindrical member 16b, terminating in second end 24b. When isolating system 10 is assembled, support arm 24 extends downwardly through central aperture 14g of lower isolator assembly 14 and extends for a distance downwardly beyond the lower ends of the first tubular member 14b and second tubular member 14c. Upper isolator assembly 16 includes a cover 16g (FIG. 3) configured to be inserted into an opening (not numbered) defined in the assembly 16 and thereby close off access to first end 24a of support arm 24.

The sidewalls 24b, 24c of support arm 24 each define a first hole 24f and a second hole 24g therein. Each first hole 24f and each second hole 24g extend between an outer surface and an inner surface of the associated sidewall 24b, 24c. The first holes 24f in the two sidewalls 24b, 24c are laterally aligned with one another and the second holes 24g in the two sidewalls 24b, 24c are laterally aligned with one another. First holes 24f are located between first end 24d and second end 24e of support arm 24. Second holes 24g are located proximate second end 24e of support arm 24. The purpose of first holes 24f and second holes 24g will be discussed later herein.

Figure 5:
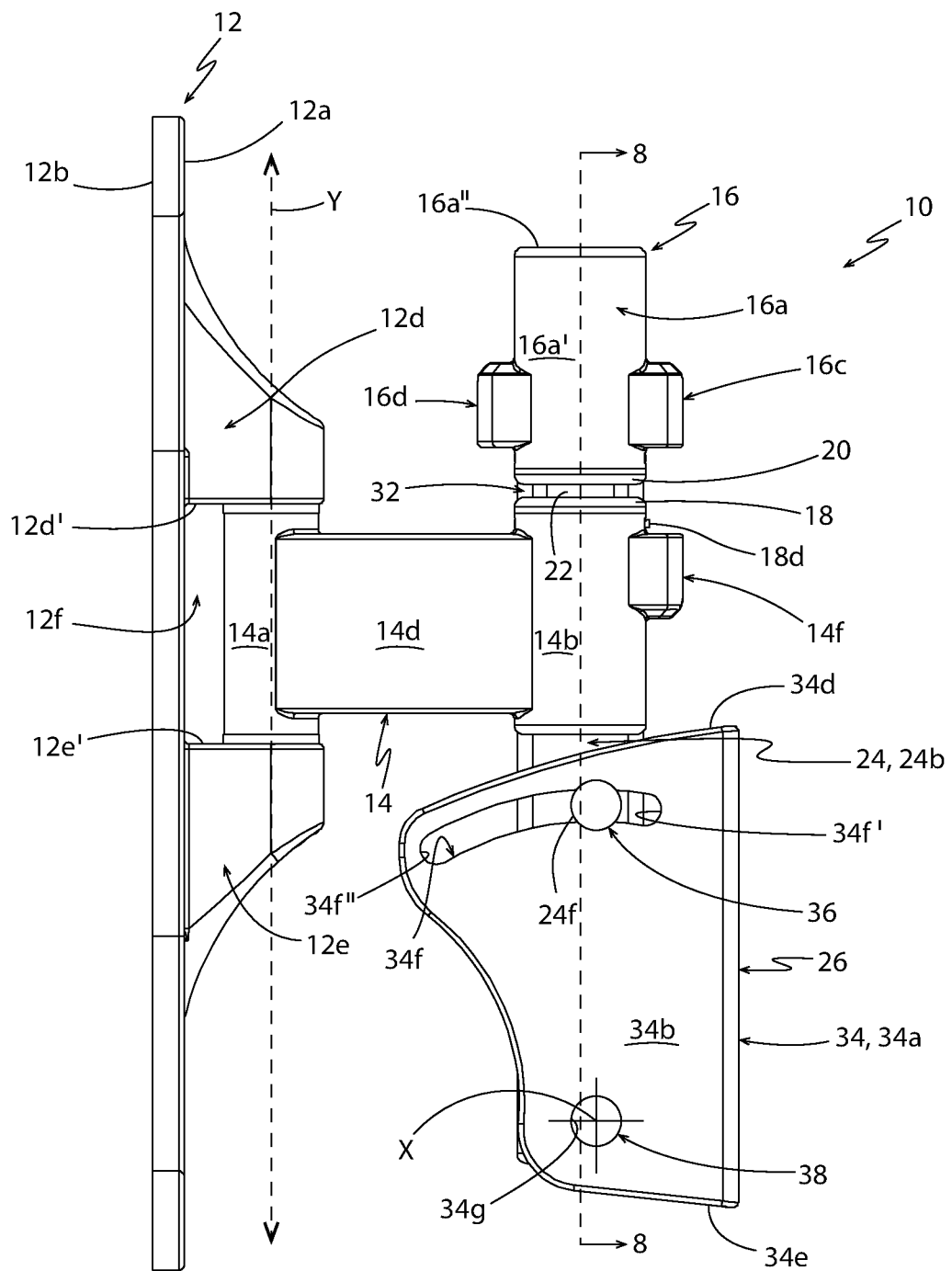
FIG. 5 is a left side elevation view of the isolating system of FIG. 2.

Referring to FIG. 3, upper isolator assembly 16 further includes a tilt assembly 26 that is operatively engaged with support arm 24. The tilt assembly 26 is further selectively operatively engaged with audio equipment "AE", as will be discussed hereafter. Tilt bracket 34 is generally U-shaped when viewed from above and comprises a front wall 34a and a pair of sidewalls 34b, 34c that extend outwardly from opposite ends of the front wall 34a. Front wall 34a and sidewalls 34b, 34c bound and define an interior channel (unnumbered) through which support arm 24 extends when isolating system 10 is assembled. Tilt bracket 34 has an upper end 34d and a lower end 34e. Each of the sidewalls 34b, 34c defines an arcuate slot 34f therein that is located a short distance downwardly from upper end 34d. Each slot 34f extends between an outer surface and an inner surface of the associated sidewall 34b, 34c and the two slots 34f are laterally aligned with one another. Each of the sidewalls 34b, 34c also defines an aperture 34g therein. The apertures 34g extend between the outer surface and the inner surface of the associated sidewall 34b, 34c and are located a short distance upwardly from lower end 34d of tilt bracket 34. As best seen in FIG. 5, apertures 34g are located a distance vertically below slots 34f and located between a forward end 34f' and a rearward end 34f'' of slot 34f. Apertures 34g in the two sidewalls 34b, 34c are laterally aligned with one another.

When isolating system 10 is assembled, support arm 24 is received within the channel defined by tilt bracket 26, the first holes 24f defined in support arm 24 are aligned with the arcuate slots 34f of tilt bracket 26, and a fastener 36 is inserted through the aligned slots 34f and first holes 24f. Fastener 36 secures tilt bracket 34 to support arm 24. Fastener 36 preferably is of a type that permits a user to loosen the engagement between tilt bracket 34 and support arm 24, adjust the angular orientation of front wall 34a of tilt bracket 34 relative to front wall 24a of support arm 24, and then be tightened so as to lock the tilt bracket 34 at the selected angular orientation relative to support arm 24. This will be described later herein.

Front wall 34a of tilt bracket 34 defines one or more openings 34h therein. Each of the one or more openings 34h extends between an outer surface and an inner surface of front wall 34a of tilt bracket 34. A first of the openings 34h is located proximate upper end 34d of tilt bracket 34 and a second of the openings 34h is located proximate lower end 34e. It will be understood that a single opening 34h may be provided in tilt bracket 34 or two or more openings 34h may be provided therein. As will be described later herein, audio equipment "AE" is able to be secured to tilt bracket 34 utilizing fasteners 41 (FIG. 10) that extend between a rear wall of the audio equipment "AE" and openings 34h. It will be understood that the shape of the openings illustrated in the attached figures is exemplary only and any type of fastener and any complementary shape of opening may be utilized to secure the audio equipment "AE" to isolating system 10. When the audio equipment "AE" is engaged with isolating system 10, the audio equipment is effectively suspended from the isolating system 10.

Isolating system 10 is assembled in the following manner. Lower isolator assembly 14 is oriented such that the openings to the bores 14b''', 14c''' defined in first tubular member 14b and second tubular member 14c, respectively face upwardly. The lower isolator assembly 14 is operatively engaged with the mounting bracket 12 as described earlier herein. Either before or after engagement of lower isolator assembly 14 with mounting bracket 12, first isolators 18 are press-fitted into bores 14b''', 14c''' of lower isolator assembly 14. The first isolators 18 are oriented so that the tabs 18d thereon align with and are ultimately received through the holes 14h defined in the sidewalls 14b' and 14c' of the associated first and second tubular members 14b, 14c. Similarly, second isolators 20 are press-fitted into bores 16a''', 16b''' of first and second cylindrical members 16a, 16b and are oriented so that the tabs 20b on second isolators 20 are received through the complementary holes 16f defined in the first and second cylindrical members 16a, 16b.

A first end of a connector member 22 is inserted into the bore 18c of each first isolator 18. Upper isolator assembly 16 is oriented so that support arm 24 is received through central aperture 14e of lower isolator assembly 14 and a second end of each connector member 22 is received into the bores 20c of the second isolators 20 in the first and second cylindrical members 16a, 16b. Upper isolator assembly 18 is pushed downwardly until the second ends of the connector members 22 abuts an interior of the top wall of the second isolators 20 and substantially no further downward motion of the upper isolator assembly 16 is possible. As described earlier herein, a gap 32 is defined between a lower surface of second isolators 20 (and a lower end of first and second cylindrical members 16a, 16b) and an upper surface of first isolators 18 (and thereby an upper end of the first and second tubular members 14b, 14c). Connector members 22 are sufficiently long enough to ensure that the second isolators 20 do not come into direct contact with the first isolators 18, and therefore there is no direct contact between first and second tubular members 14 and first and second cylindrical members 16, even when a maximum weight of the audio equipment "AE" is supported by isolating system 10. Upper and lower isolators 20, 18 have multiple functions in isolating system 10. The ends of the connector members 22 engage the upper and lower isolators 20, 18 to dampen vertical vibrations while the interference fit of the connector members 22 in the isolators 20, 18 provides dampening of horizontal vibrations while resisting lateral deflection.

Tilt bracket 34 is slipped around the lower end of the support arm 24 so that front wall 24a of support arm 24 is proximate an interior surface of front wall 34a of tilt bracket 34. Tilt bracket 24 is moved upwardly towards the lower isolator assembly 14 until arcuate slots 34f of tilt bracket 34 are aligned with first holes 24f of support arm 24. Fastener 36 is engaged through the aligned slots 34f and first holes 24f. Holes 34g defined in tilt bracket 34 are also brought into alignment with second holes 24g in support arm 24, and a second fastener 38 is inserted through the aligned holes 34g and 24g. Second fastener 38 will act as a pivot rod for tilt assembly 26. In particular, a pivot axis "X" extends along the shaft of the second fastener 38 and the tilt assembly 26 is able to pivot about the pivot axis "X", as will be described later herein.

Once isolating system 10 is fully assembly, mounting bracket 12 is secured to a suitable support surface "SS" by inserting fasteners 40 (FIG. 9) through the various screw holes 12c defined in mounting bracket 12 and into holes provided in the support surface "SS'. Audio equipment "AE" is then engaged with tilt bracket 34 by inserting fasteners 41 (FIG. 10) extending from a rear wall of the audio equipment "AE" through holes 34h in front wall 34a of the tilt bracket 34. Nuts (not shown) may be engaged with the fasteners 41 to secure the audio equipment "AE" to tilt bracket 34. In some embodiments, an adapter may be secured between the audio equipment "AE" and the tilt bracket 34 by fasteners 41. The adapter will be configured to be specific to the particular type of audio equipment being mounted to the support surface "SS" by isolating system 10.

It should be noted that there is no contact or engagement between any part of support arm 24 and lower isolator assembly 14. The lack of contact between lower isolator assembly 14 and support arm 24 is at least partially ensured by the fact that central aperture 14g is substantially larger than the cross-sectional dimensions of support arm 24. Support arm 24 is effectively suspended from upper isolator assembly 14. The upper isolator assembly 16 of isolating system 10 entirely supports the weight of the audio equipment "AE". The point of securement of the audio equipment "AE" to the upper isolator assembly 16 is at a location a distance vertically below the lower isolator assembly 14 (i.e., at fastener 36). This arrangement ensures that the only contact between upper isolator assembly 16 and lower isolator assembly 14 is via the resilient first and second isolators 18, 20 and the connector members 22. Consequently, when audio-equipment "AE" is engaged with tilt bracket 26 and thereby with upper isolator assembly 16, any vibrations from the audio equipment will be dampened by the first and second isolators 18, 20 and will not be transferred from the upper isolator assembly 16 to the lower isolator assembly 14 and thereby to the mounting bracket 12 and support surface "SS". It should additionally be noted that any vibration from the support surface "SS" that are passed on to mounting bracket 12 and thereby to lower isolator assembly 14 will be dampened by first and second isolators 18, 20, and connector members 22, and will therefore not be passed to the upper isolator assembly 16 and thereby to audio equipment "AE". Mounting the audio equipment "AE" to the support surface "SS" using the isolating system 10 therefore attenuates vibration from and to the audio equipment "AE" and therefore greatly improves the quality of sound from the equipment.

Figure 9:
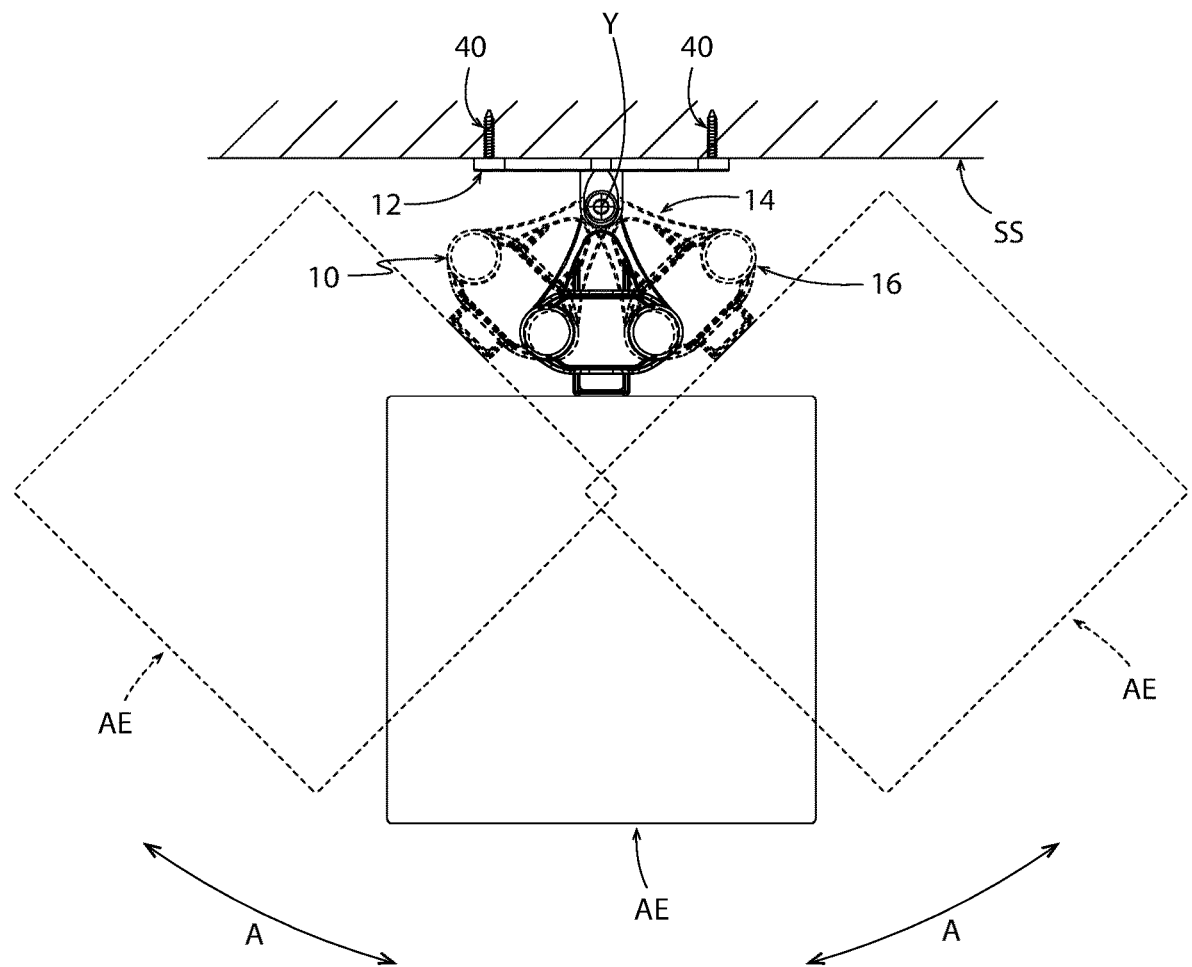
FIG. 9 is a top plan view showing the isolating system of FIG. 2 illustrated pivotal panning motion of the audio equipment in a horizontal plane, where the pivotal motion occurs about a vertical axis.
Figure 10:
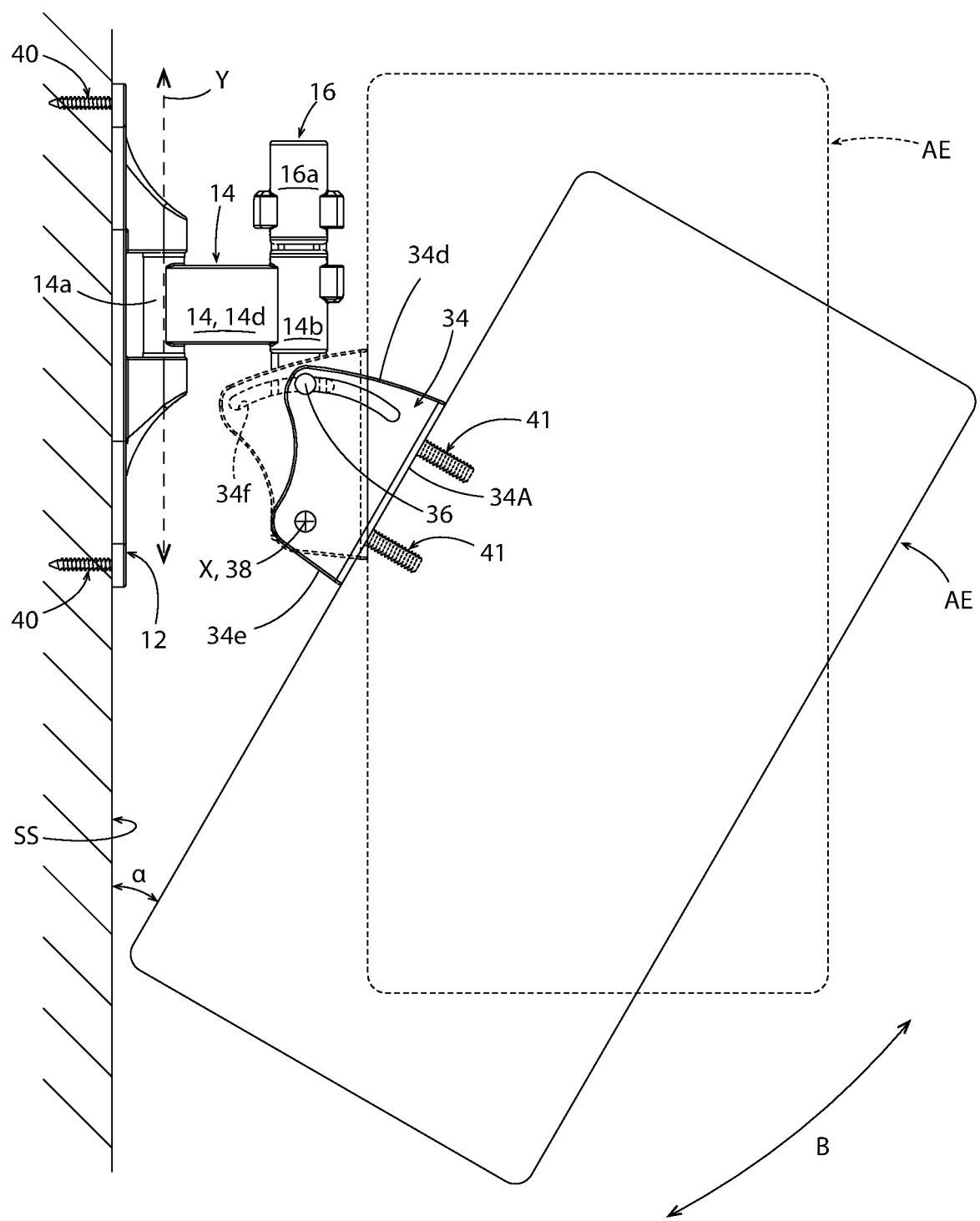
FIG. 10 is a left side elevation view showing the isolating system of FIG. 2 showing a possible tilt motion of the audio equipment in a vertical plane, where the tilt motion occurs about a horizontally-oriented tilt axis.
Figure 11:
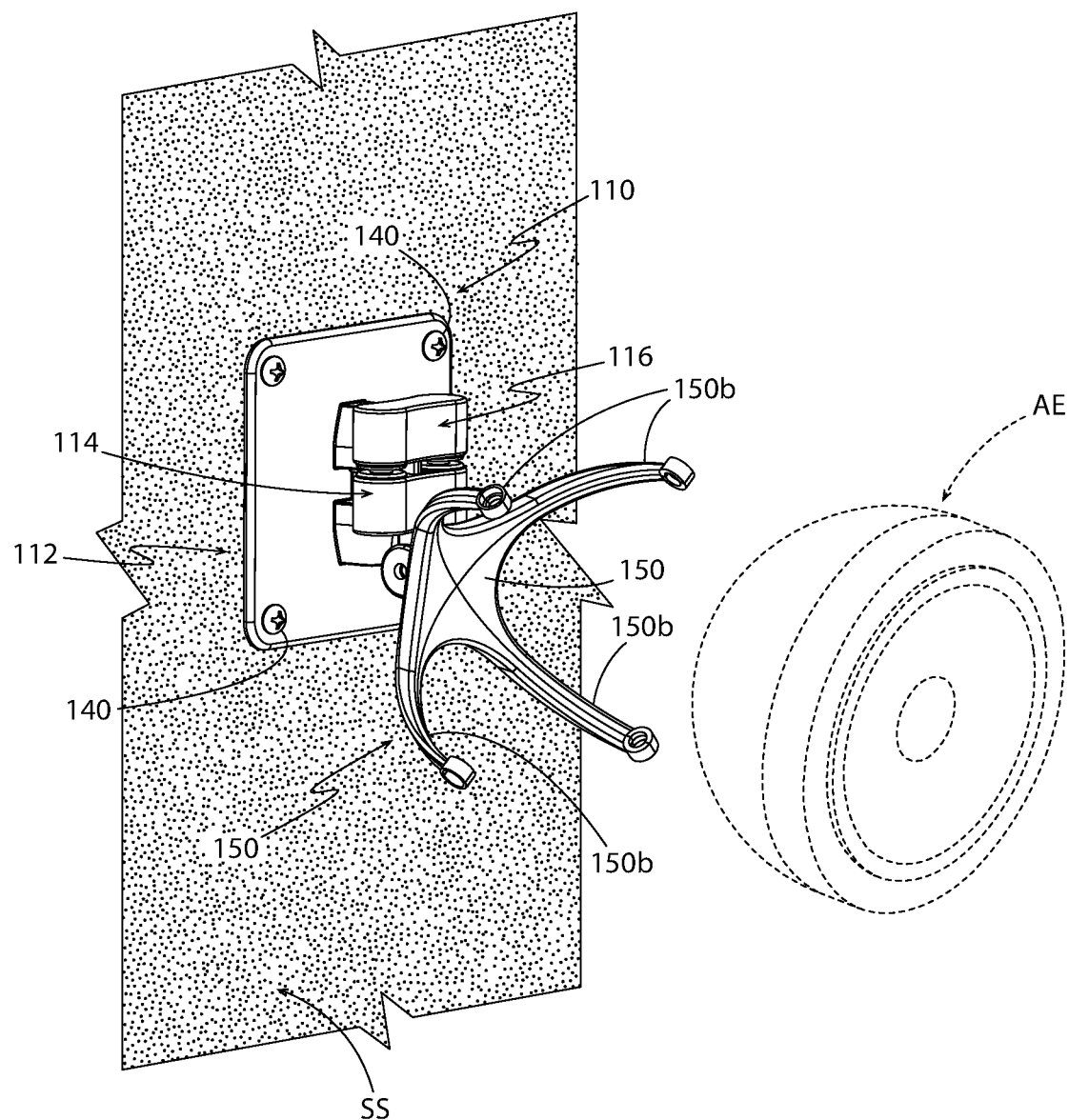
FIG. 11 is a left side, top, front perspective view of a second embodiment of an isolating system in accordance with the present disclosure, shown mounted on a wall and illustrating differently configured audio equipment, in phantom, ready for engagement with the isolating system.
Figure 12:
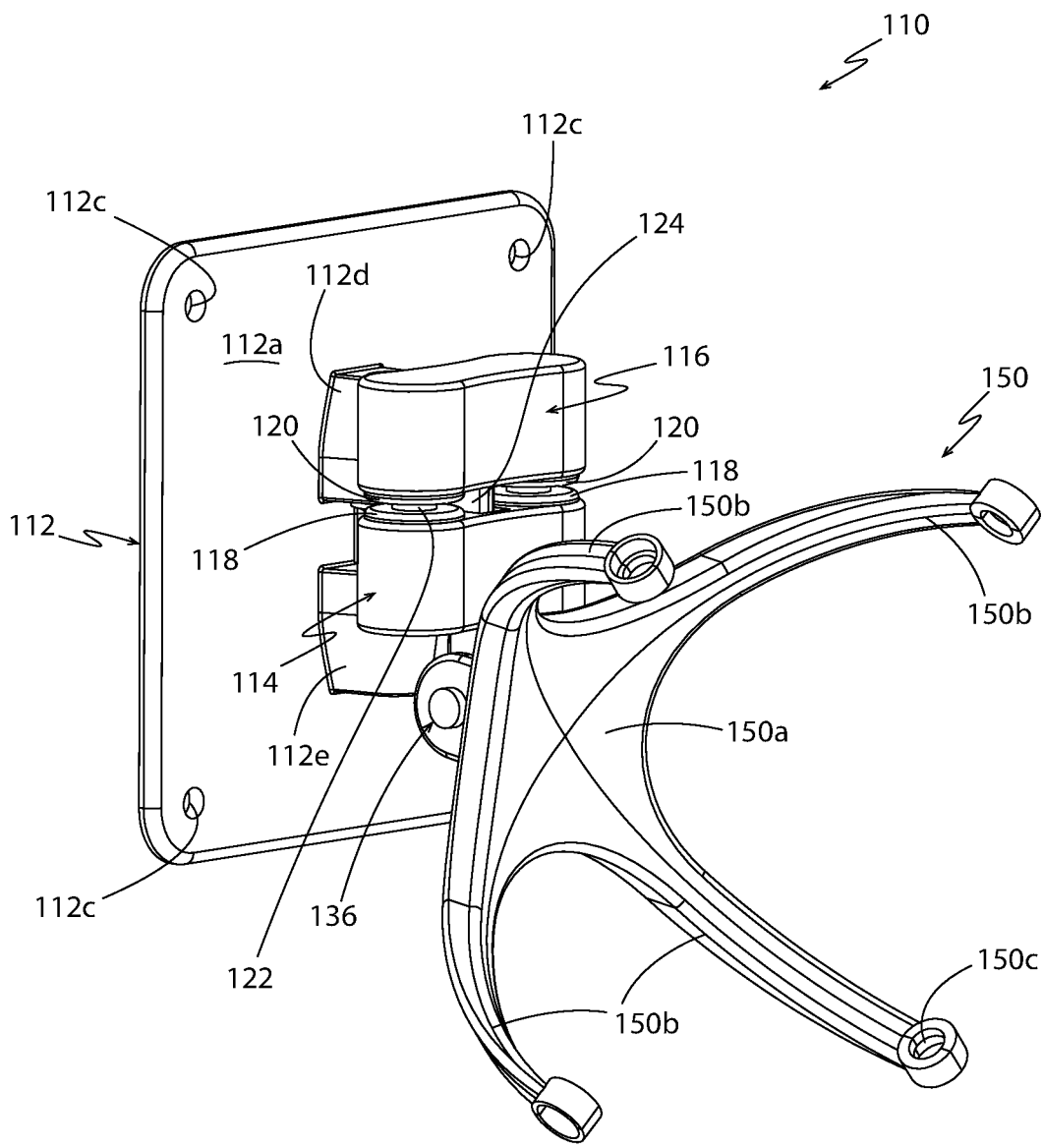
FIG. 12 is a left side, top, front perspective view of the isolating system of FIG. 11 in accordance with the present disclosure and shown in isolation.

In addition to dampening vibration from or to audio equipment "AE", isolating system 10 also provides a way for a user to adjust the orientation of the audio equipment relative to the support surface "SS" in both a horizontal plane and a vertical plane. The user is able to adjust the horizontal and vertical orientation of the audio equipment "AE" using the isolating system 10 and is therefore able to direct sound in a desired direction into a room. FIG. 9 is a top plan view showing possible pivoting panning motion of the audio equipment "AE" in a horizontal plane which is enabled by the isolating system 10. The upper and lower isolator assemblies 14, 16 and thereby the audio equipment "AE" are able to be pivoted relative to the mounting bracket 12 about a vertical axis "Y" (FIGS. 5, 7, 10). The vertical axis "Y" runs along the shaft of the pivot rod 28 which secures the lower isolator assembly 14 to the mounting bracket 12. The pivoting motion to the left or right of a central position is indicated by the arrow "A" in FIG. 9. The pivotal motion is accomplished by a user simply pushing the audio equipment "AE" physically to the left or right of the central position to the desired orientation.

FIG. 10 is a left side elevation view showing possible tilting motion of the audio equipment "AE" in a vertical plane which is enabled by isolating system 10. The tilting motion occurs about a horizontally-oriented tilt axis "X" (FIG. 10). If the user wishes to tilt the audio equipment "AE" relative to support surface "SS", the fastener 36 is loosened (but not removed from isolating system 10). A pushing or pulling force is applied to the audio equipment "AE" to move the same through a vertical plane to a desired angle α relative to mounting bracket 12 and thereby to support surface "SS". The audio equipment "AE" pivots about the horizontal axis "X" extending along the shaft of fastener 38 in a direction indicated by arrow "B". When audio equipment "AE" is at the desired angle of tilt relative to mounting bracket 12 and thereby to support surface "SS", the fastener 36 is tightened once again to lock audio equipment "AE" at that desired angle α. It will be understood that the degree of tilt of the audio equipment relative to the support surface is limited by the length and curvature of the slot 34f through which fastener 36 extends. The degree of upward tilt is reached when fastener 36 contacts the first end 34f' of slot 34f. The degree of downward tilt is reached when fastener 36 contacts the second end 34f'' of slot 34f.

A method of using isolating system 10 in accordance with an aspect of the present disclosure includes using isolating system 10 to reducing transfer of vibration between audio equipment "AE" and a support surface "SS" comprising providing an isolating system 10 having a lower isolator assembly 14 and an upper isolator assembly 16, wherein an only point of contact between the lower isolator assembly 14 and the upper isolator assembly 16 is via a connector member 22 extending between a resilient upper isolator 20 in the upper isolator assembly 16 and a resilient lower isolator 18 in the lower isolator assembly 14; operatively engaging the lower isolator assembly 14 to the support surface "SS"; operatively engaging the audio equipment "AE" to the upper isolator assembly 16; and dampening vibration to or from the audio equipment "AE" with the resilient upper isolator 20 of the upper isolator assembly 16 and the resilient lower isolator 18 of the lower isolator assembly 14.

Engaging the lower isolator assembly 14 with the support surface "SS" includes engaging the lower isolator assembly 14 to a mounting bracket 12 and securing the mounting bracket 12 to the support surface "SS". Engaging the lower isolator assembly 14 to the mounting bracket 12 comprises pivotally connecting the lower isolator assembly 14 to the mounting bracket 12. The method further comprises pivoting the lower isolator assembly 14 and upper isolator assembly 16 in unison about a vertically-oriented pivot axis "Y" (which extends along the shaft of fastener 28), and moving the audio equipment "AE" through a horizontal plane as illustrated in FIG. 9, as indicated by the arrow "A".

The method further comprises engaging a tilt assembly 24, 26 with the upper isolator assembly 16 and pivotally connecting the audio equipment "AE" to the tilt assembly 24, 26 via fasteners 41 and utilizing an adapter if required. The method further comprises pivoting the audio equipment "AE" about the horizontally-oriented pivot axis "X" (FIG. 5) that extends along the shaft of fastener 38; and moving the audio equipment "AE" through a vertical plane as indicated by arrow "B" in FIG. 10. The method further comprises suspending the audio equipment "AE" from the upper isolator assembly 16. The method further comprises connecting the audio equipment "AE" to the upper isolator assembly 16 at a location vertically below the lower isolator assembly 14. This is readily seen in FIG. 5, for example, where the fasteners 36 and 38 securing the audio equipment to the support arm 24 and tilt assembly 26 are clearly located a distance vertically below the first isolator assembly 14. The audio equipment has a weight, and the method further comprises bearing the weight of the audio equipment with the upper isolator assembly 16. The method further comprises providing a support arm 24 on the upper isolator assembly 16; defining an aperture 14g (FIG. 3) in the lower isolator assembly 14; receiving the support arm 24 through the aperture 14g, dimensioning the support arm 24 relative to the aperture 14g such that no contact is made between the support arm 24 and the lower isolator assembly 14 when the support arm 24 is received through the aperture 14g; and securing the audio equipment "AE" to the support arm 24 a distance below the lower isolator assembly 14.

Referring now to FIGS. 11 through 14, there is shown a second embodiment of a wall-mounted isolating system generally indicated at 110. Isolating system 110 is contemplated to be useful to support a smaller, lighter weight audio speaker or other type of audio equipment "AE" on a support surface "SS". Isolating system 110 includes a mounting plate 112, a lower isolator assembly 114 that is operatively engaged with the mounting plate 112, and an upper isolator assembly 116. A cradle 150 is illustrated as being engaged with the upper isolator assembly 116 to secure audio equipment "AE" thereto.

Mounting bracket 112 comprises a plate having a front surface 112a, a rear surface 112b (FIG. 13) and defining a plurality of holes 112c therein that extend between the front and rear surfaces. As illustrated, plate 112 is rectangular in shape when viewed from the front but it will be understood that the plate may be fabricated in any desired shape. Holes 112c are located and configured to receive fasteners 140 therethrough in order to secure mounting bracket 112 to support surface "SS". Mounting bracket 112 further includes a first support 112d and a second support 112e which extend outwardly and forwardly away from front surface 112a. First support 112d and second support 112e are cast with the plate so that they are integral therewith. First and second supports 112d, 112e are vertically spaced a distance apart from one another such that a gap is defined between a lower surface 112d' of first support 112d and an upper surface 112e' of second support 112e. This gap can be readily seen in FIG. 14 and is indicated by reference character 112f.

Figure 14:
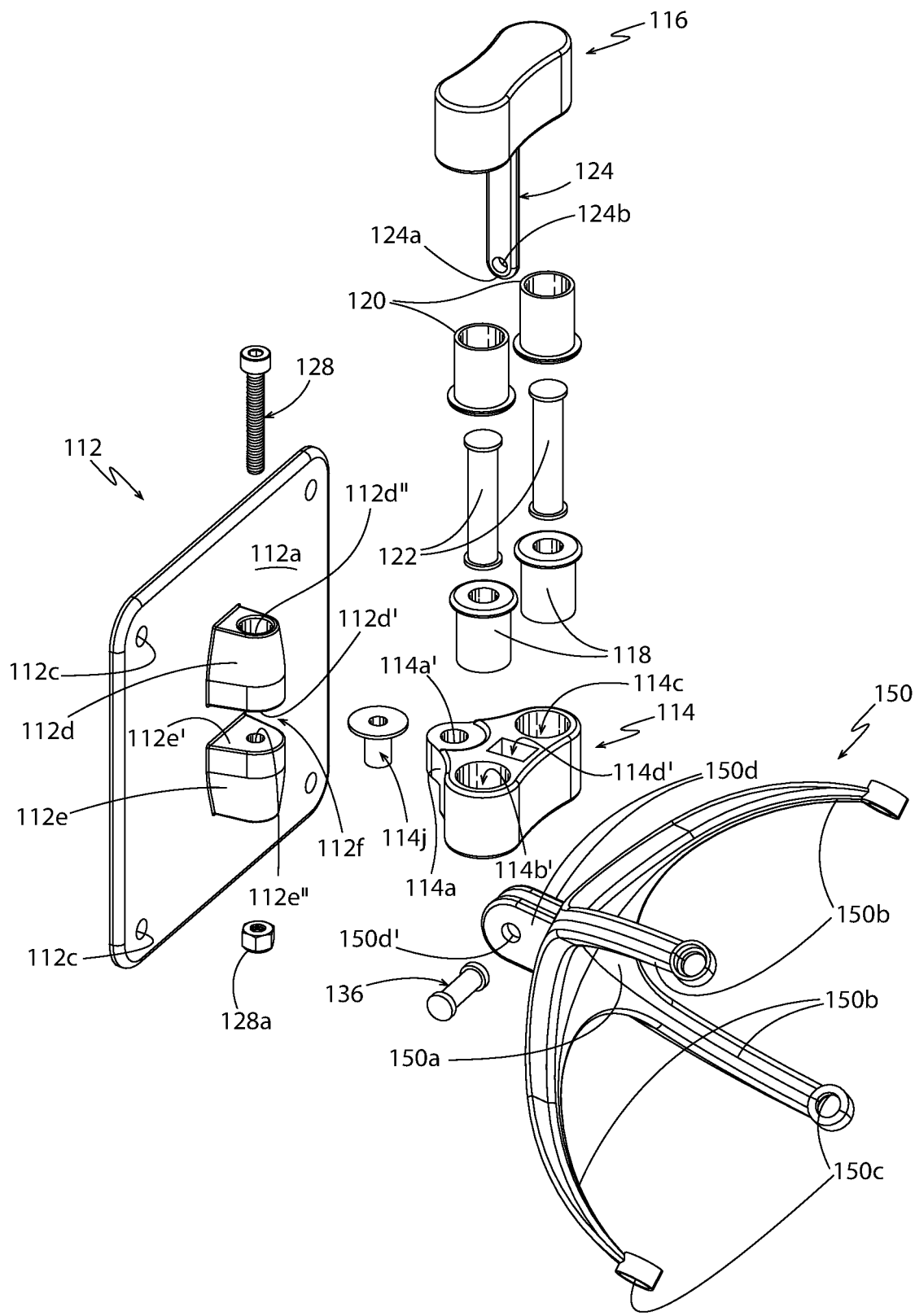
FIG. 14 is an exploded left side, top, front perspective view of the isolating system of FIG. 12.

As best seen in FIG. 14, first support 112d defines a through-hole 112d" therein that extends from an upper surface (not numbered) of first support 112d through to the lower surface 112d' thereof. Second support 112e defines an aperture 112e" therein that extends inwardly for a distance from upper surface 112e' of second support 112e through to a lower surface (not numbered) thereof. Through-hole 112d" and aperture 112e" are vertically aligned with one another. A pivot rod 128 is insertable through the aligned through-hole 112d" and aperture 112e" for a reasons that will be later described herein. The shaft of pivot rod 128 is threaded and a nut 128a may be threadedly engaged with pivot rod 128 to retain the fastener in engagement with the mounting bracket 12, as will be further described herein.

Referring particularly to FIG. 14, lower isolator assembly 114 is a cast component that is generally triangular in shape when viewed from above. Lower isolator assembly 114 has an integrally formed hub 114a configured to be received within the gap 112f defined between first support 112d and second support 112e of mounting bracket 112. Hub 114a defines a through-hole 114a' therein that extends between an upper surface and a lower surface of the hub 114a. Lower isolator assembly 114 further defines a first bore 114b' and a second bore 114c'. First bore 114b' and second bore 114c' are laterally aligned with one another, are laterally spaced a distance apart from one another, and are located forwardly of hub 114a. Hole 114a' through hub 114a is longitudinally aligned with a location that is generally centrally located between first bore 114b' and second bore 114c. Each of the first bore 114b' and second bore 114c' originates in an upper surface of lower isolator assembly 114 but terminates a distance inwardly from a bottom surface of lower isolator assembly 114. An opening 114d' is defined in the region intermediate first bore 114b' and second bore 114c' forwardly of hole 114a' of hub 114. The opening 114d' extends from an opening in the upper surface of the lower isolator assembly 114 to an opening in the lower surface of the lower isolator assembly 114.

Still referring to FIG. 14, Hole 114a' of lower isolator assembly is configured to be aligned with the through hole 112d" and aperture 112e" when hub 114a is received within the gap 112f of mounting bracket 112. A bushing 114j is engageably insertable into hole 114a' of hub 114a prior to positioning hub 114a in the gap 112f. Bushing 114j defines an aperture that is in communication with the hole 114a' through hub 114a. When hub 114a is located within the gap 112f of mounting bracket 112, the pivot rod 128 is inserted into the aligned through hole 112d", the hole in bushing 114j, the hole 114a' of hub 114a, and the aperture 112e" of second support 112e. Nut 128a is engaged with pivot rod 128 to secure lower isolator assembly 114 to mounting bracket 112. Although not illustrated in the attached figures, it will be understood that the aperture 112e' has a lower region that is shaped and sized to receive nut 128a therein so that the nut 128a is effectively countersunk into second support 112e and is therefore not readily visible when mounting bracket 112 is observed from the side as in FIG. 13.

Figure 13:
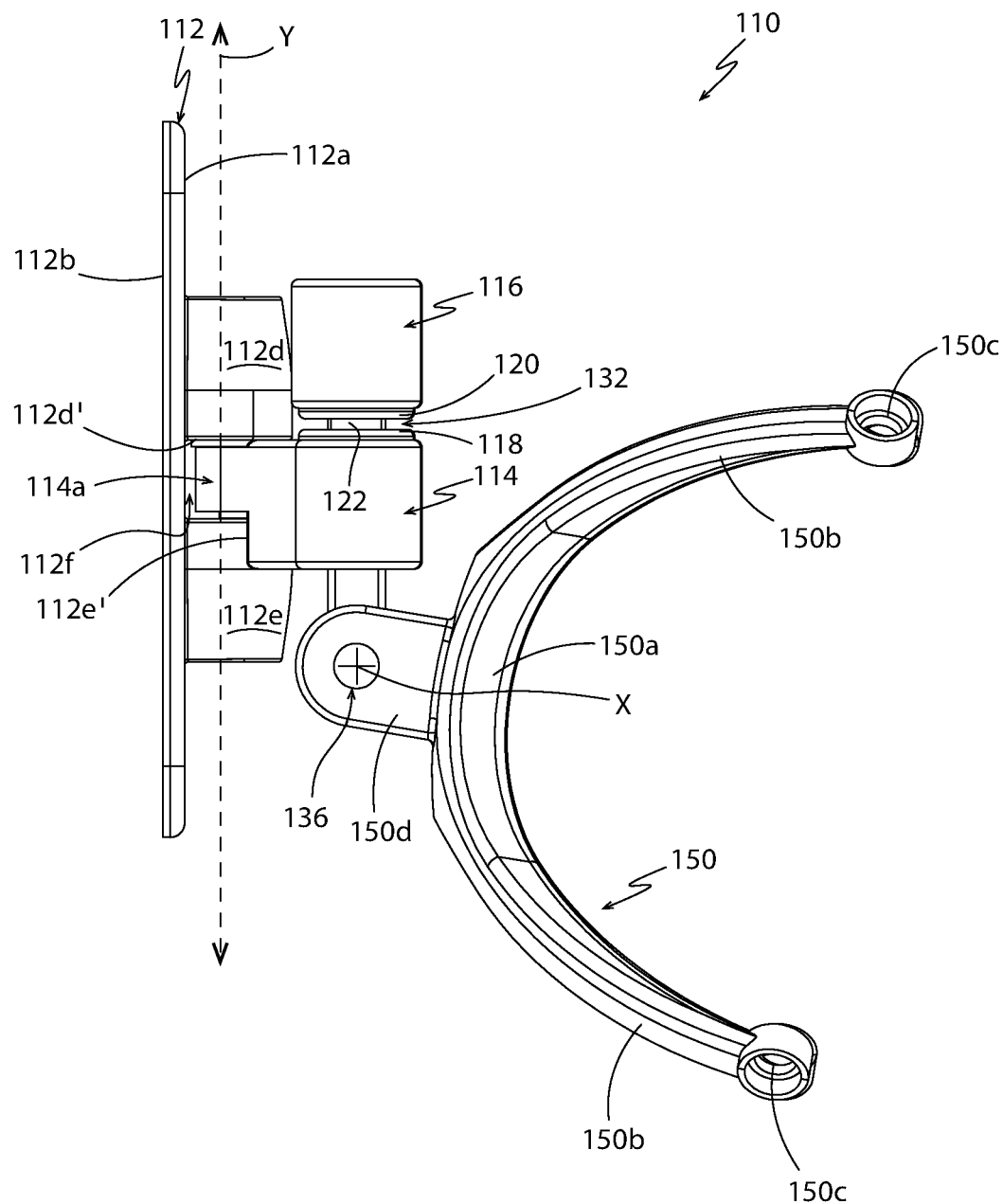
FIG. 13 is a left side elevation view of the isolating system of FIG. 12.

Continuing to refer to FIG. 14, first bore 114b' and second bore 114c' are configured to receive first isolators 118 therein in a same manner that first isolators 18 are received with the first bore 14b''' and second bore 14c''' of first and second tubular members 14b, 14c of isolating system 10. First isolators 118 are substantially identical in structure and function to first isolators 118 except that first isolators 118 are not provided with a tab similar to tab 18d of first isolators 18. It will be understood, however, that in other embodiments a tab similar to tab 18d may be provided on first isolators 118. In these instances lower isolator assembly 114 will be provided with appropriate openings to receive those tabs. Since first isolators 118 are substantially identical to first isolators 18 in structure and function, they will not be further described herein. First isolators 118 are press-fitted into the first bore 114b' and second bore 114c' and an upper region of the first isolators 118 extends upwardly beyond the upper surface of the lower isolator assembly 114 as can be seen in FIG. 13.

Upper isolator assembly 116 is a cast component configured to retain second isolators 120 therein and to secure the audio equipment "AE" to isolating system 110. Although not illustrated in the attached figures, upper isolator assembly 116 defines a first bore similar to first bore 114b' and configured to receive a first one of the second isolators 120 therein. Upper isolator assembly 116 further defines a second bore similar to second bore 114c' and configured to receive the other one of the second isolators 120 therein. Each of the first bore and the second bore defined in the upper isolator assembly 116 originates in a lower surface of the upper isolator assembly 116 and extends upwardly for a distance, terminating before reaching the upper surface of the upper isolator assembly 116. The first bore and second bore defined in the upper isolator assembly are laterally aligned with one another and are laterally spaced apart from one another in a substantially identical configuration to the arrangement of the first bore 114b' and second bore 114c' of lower isolator assembly 114.

Second isolators 120 are substantially identical in structure and function to second isolators 20 therefore will not be further described herein. Second isolators 120 are press-fitted into the first bore and the second bore of upper isolator assembly 116 and a lower region of the second isolators 120 extends downwardly beyond the lower surface of the upper isolator assembly 116 as can be seen in FIG. 13.

Upper isolator assembly 116 is also cast to include a support arm 124 which extends downwardly from the lower surface of the upper isolator assembly 116. In particular, the support arm 124 is located in a region intermediate the first bore and the second bore in the lower surface of the upper isolator assembly 116. Support arm 124 extends downwardly from upper isolator assembly 116 and terminates in a free end 124a a distance below the lower surface of upper isolator assembly 116. An opening 124b is defined in support arm 124 a short distance above the free end 124a. The opening 124b extends between a first side and a second side of the support arm 124. Support arm 124 is configured and located so as to be receivable through the opening 114d' defined in lower support assembly 114. It should be understood that the opening 114d' is substantially wider and longer than the dimensions of the support arm 124. When support arm 124 is received through opening 114d' there is no contact whatsoever between support arm 124 and any part of lower isolator assembly 114.

When isolating system 110 is assembled, first isolators 118 are press-fitted into the lower isolator assembly 114 and second isolators 120 are press-fitted into the upper isolator assembly 116. The hub 114a of lower isolator assembly 114 is inserted into the gap 112f defined between the first and second supports 112d, 112e of mounting bracket 112. The pivot rod 128 is utilized to secure lower isolator assembly 114 to mounting bracket 112. First ends of connector members 122 are inserted into the recesses defined in first isolators 118 (in an identical manner to how first ends of connector members 22 are inserted into recesses 18c of first isolators 18 of isolating system 10). Upper isolator assembly 116 is lowered into engagement with connector members 122 so that support arm 124 is received through opening 114d' and second isolators 120 engage connector members 122. The second ends of the connector members 122 are received within the bores defined by second isolators 120 (in an identical manner to how the second ends of the connector members 22 are inserted into recesses 20c of second isolators 20 of isolating system 10). Upper isolator assembly 116 is pushed downwardly until the connector members 122 contact an interior upper surface of the second isolators 120 which define the recesses equivalent to recesses 20c in second isolators 20. As shown in FIG. 13, when upper isolator assembly 116 is in its closest proximity to lower isolator assembly 114, a gap 132 is defined between an uppermost region of first isolators 118 and a lowermost region of second isolators 120. There is no direct contact between an uppermost surface of lower isolator assembly 114 and a lowermost surface of upper isolator assembly 116. In other words, connector members 122 are of a sufficient length to prevent upper isolator assembly 116 and lower isolator assembly 114 from directly contacting each other. Support arm 124 extends downwardly for a distance below the lower surface of lower isolator assembly 114 for a reason that will be described hereafter.

The audio equipment "AE" to be secured to support surface "SS" by isolating system 110 is illustrated to be of a particular design that includes a dome-shaped rear region. A cradle 150 is illustrated as being selectively securable to isolating system 110. Cradle 150 is complementary in shape to the particular piece of audio equipment "AE" illustrated in FIG. 11. It will be understood that if the audio equipment to be engaged with isolating system is differently configured then a differently configured cradle 150 that is complementary to that different audio equipment will be engaged with isolating system 110. Cradle 150 should therefore be understood to be exemplary only and not limit the scope of the isolating system. Because cradle 150 is exemplary only, it will not be described in any great detail herein.

Cradle 150, as illustrated, includes a base 150a with a plurality of arms 150a radiating outwardly from the base 150a. Each arm 150b defines an opening 150c therein through which fasteners (not shown) may be inserted to secure the arms 150b to the audio equipment "AE". A pair flanges 150d extend from a rear region of base 150a. Each flange 150d defines an aperture 150d' therein. Flanges 150d are laterally spaced apart from one another to a sufficient degree to receive support arm 124 of isolating system 110 therebetween. When support arm 124 is received between the flanges 150d, the apertures 150d' of the two flange 150d align with the opening 124b defined in support arm. A fastener 136 is inserted through the aligned apertures 150d' and opening 124b to secure cradle 150 to support arm 124 and thereby to upper isolator assembly 116.

Cradle 150 is suspended from upper isolator assembly 116 and there is no contact between cradle 150 and lower isolator assembly 114. The point of contact between cradle 150 and upper isolator assembly 116 is located vertically below the lower isolator assembly 114. There is therefore no direct contact between the audio equipment "AE" and the lower isolator assembly 114. The only contact between upper isolator assembly 116 and lower isolator assembly 116 is via the resilient first and second isolators 118, 120 and the connector members 122. As a consequence, any vibrations from audio equipment "AE" will be dampened by the resilient first and second isolators 118, 120. Similarly any vibrations that may be transmitted from the support surface "SS" to which mounting bracket 112 is secured may be transmitted to lower isolator assembly 114 but will be dampened or attenuated by first and second isolators 118, 120 and will therefore not tend be transmitted to upper isolator assembly 116 and thereby to audio equipment "AE". Utilizing isolating system 110 to mount audio equipment "AE" to support surface "SS" will tend to improve the sound quality from the audio equipment.

Similar to isolating system 10, isolating system 110 enables a user to change the orientation of the audio equipment "AE" relative to the support surface "SS" in both a horizontal plane and a vertical plane. The audio equipment may be moved horizontally to the left or right by rotating the lower isolator assembly 114, upper isolator assembly 116, cradle 150, and audio equipment "AE" about a vertical axis "Y" (FIG. 13). The vertical axis "Y" extends along the shaft of the pivot rod 128 which secures lower isolator assembly 114 to mounting bracket 112. The pivoting panning motion of the audio equipment that is enabled by isolating system 110 is substantially identical to the pivoting panning movement of the audio equipment through a horizontal plane about a vertical axis "Y" enabled by the isolating system 10 illustrated in FIG. 9. If a user wishes to rotate the audio equipment to a desired orientation relative to the mounting bracket 112 and thereby to the support surface "SS", the user will simply loosen fastener 128 and push on the audio equipment. The pushing force will cause the audio equipment to move through the horizontal plane, pivoting about the vertical axis "Y" which extends along the shaft of the pivot rod 128 extending through the first and second supports 112d, 112e. When the audio equipment "AE" is in the desired position and orientation, the user will retighten the fastener 128.

Isolating system 110 also enables a user to tilt the audio equipment "AE" in a similar manner to how isolating system 10 enables tilting of the audio equipment illustrated in FIG. 10. FIG. 13 shows a horizontal axis "X" about which the cradle 150 may be pivoted through a vertical plane. The horizontal axis "X" extends along the shaft of the fastener 136 which secures the cradle 150 to upper isolator assembly 116. If a user wishes to tilt the audio equipment "AE" held in cradle 150, the fastener 136 may be slightly loosened, the audio equipment is moved through the vertical plane and when the desired angle of tilt relative to the mounting bracket 112 and thereby support surface "SS" is achieved, the fastener 136 is tightened once again to lock the audio equipment in the desired angular orientation.

Referring to FIGS. 15 through 22, there is shown a third embodiment of an isolating system 210 in accordance with the present disclosure. Isolating system 210 is configured to be secured to a flat support surface "SS" such as a vertical wall (or an angled wall) and to suspend the audio equipment "AE" a distance vertically above a ground surface (not shown). The isolating system 210 bears the weight of audio equipment "AE" and dampens vibration and thereby substantially prevents vibrations from being transmitted between the audio equipment "AE" and the support surface "SS".

Figure 16:
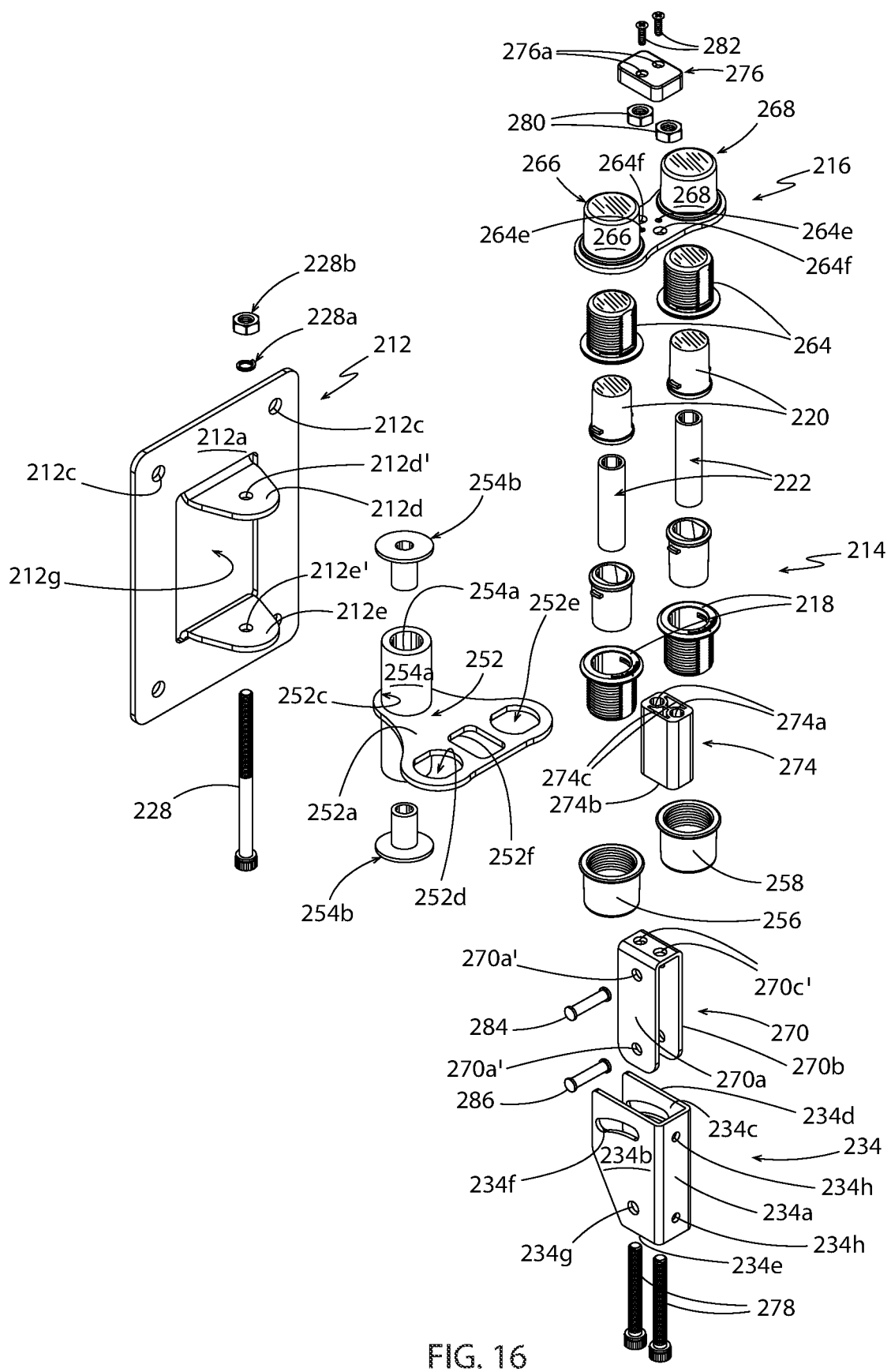
FIG. 16 is an exploded left side, top, front perspective view of the isolating system shown in FIG. 15.

As shown in FIG. 16, isolating system 210 comprises a mounting bracket 212, a lower isolator assembly 214, an upper isolator assembly 216, first isolators 218, second isolators 220, connector members 222, and a tilt assembly 224 that are operatively engaged with each other as will be described hereafter.

Figure 17:
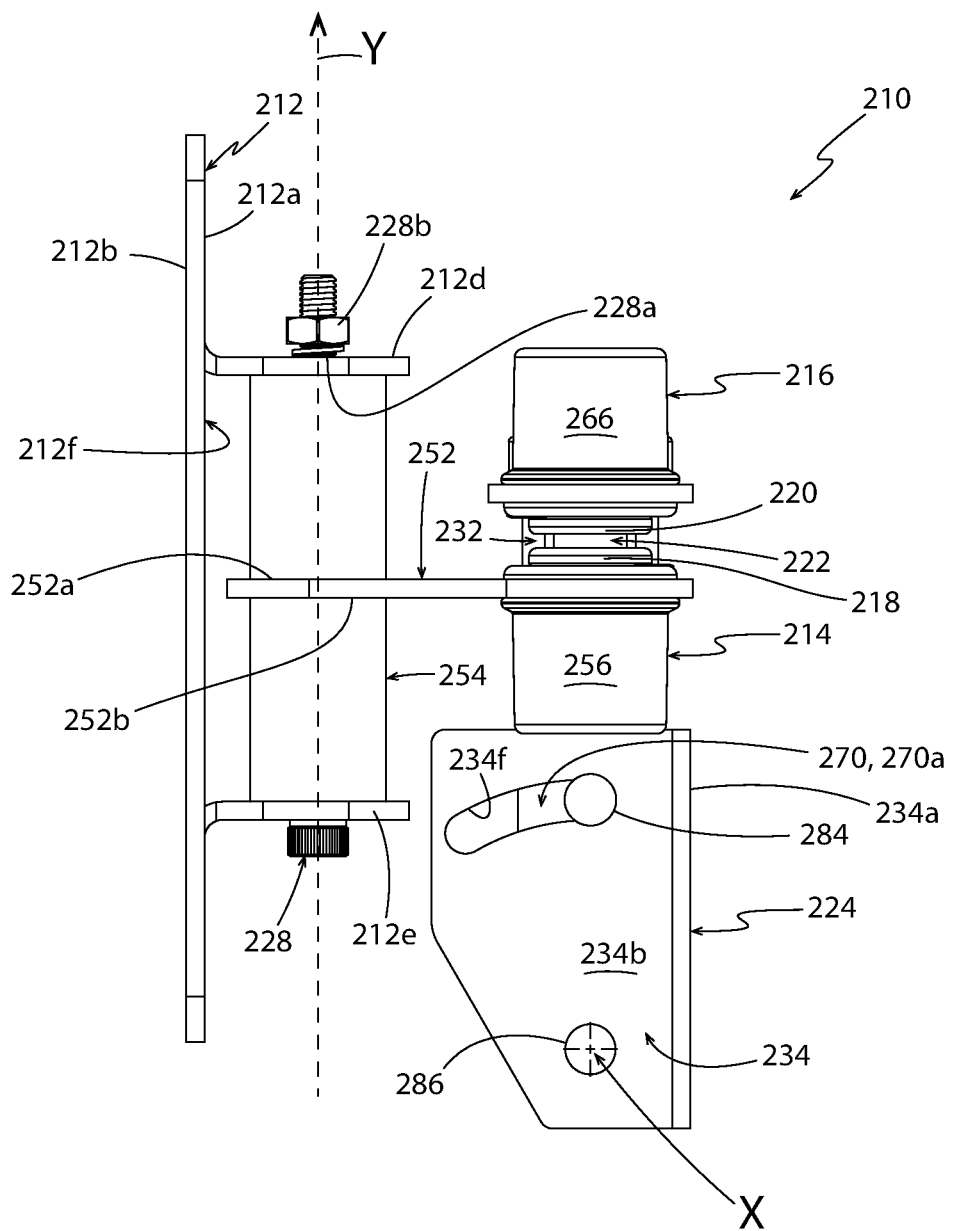
FIG. 17 is a left side elevation view of the assembled isolating system of FIG. 16.
Figure 18:
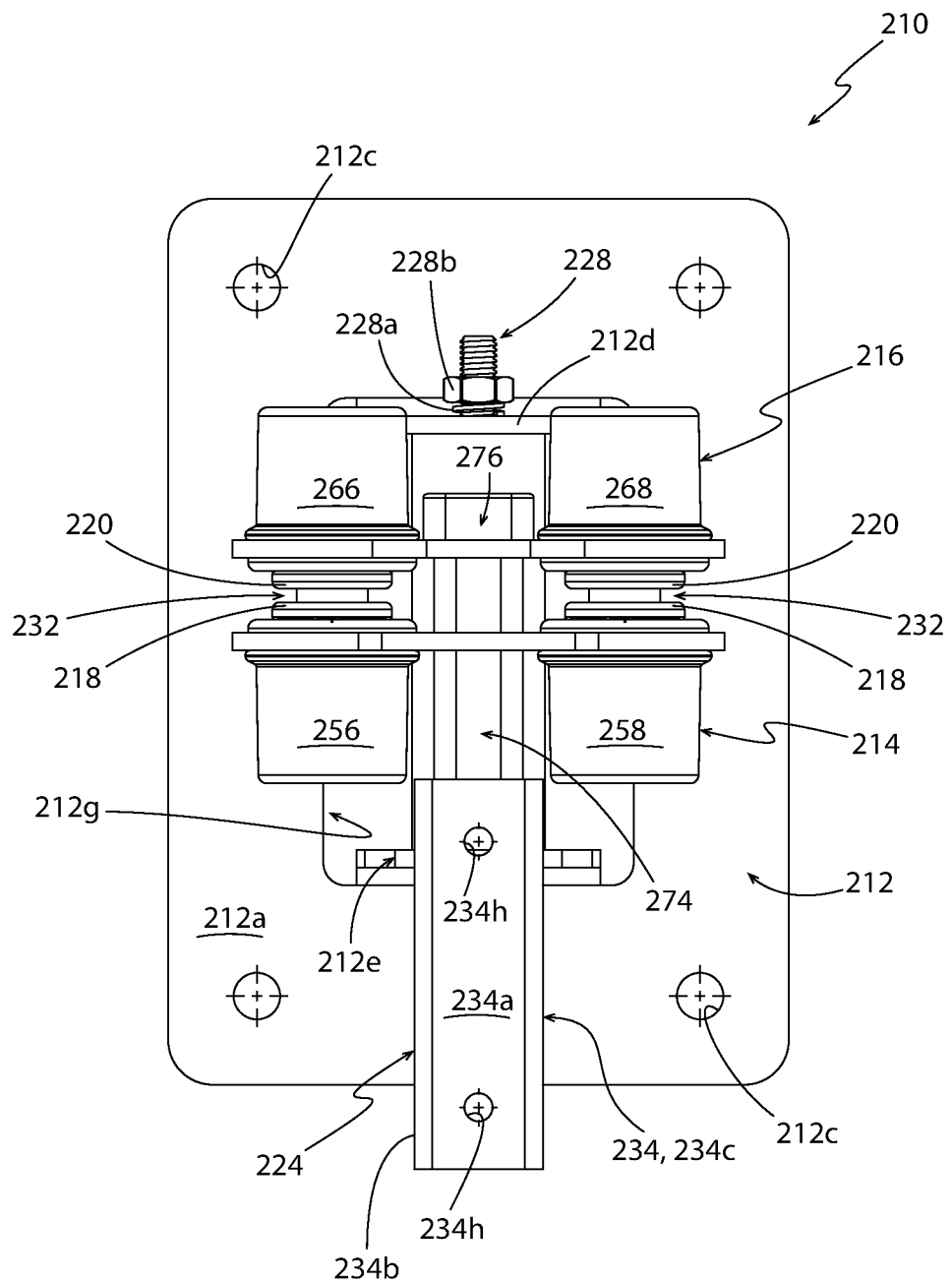
FIG. 18 is a front elevation view of the isolating system of FIG. 17.

Referring particularly to FIGS. 16 and 17, mounting bracket 212 is a generally flat plate having a front surface 212a and a rear surface 212b. Mounting bracket 212, as illustrated herein, is generally rectangular in shape when viewed from the front but it will be understood that the plate may be shaped in any desired fashion. For example, the plate may be circular when viewed from the front, or triangular, or an irregular shape. The rectangular mounting bracket 212 is provided with rounded corners. A plurality of apertures 212c is defined proximate the four corners of mounting bracket 212. Each aperture 212c extends from front surface 212a through to rear surface 212b. When isolating system 210 is mounted on support surface "SS", rear surface 212b is placed against the support surface "SS" and fasteners 240 is inserted through apertures 212c to secure mounting bracket 212 to support surface "SS". The apertures 212c may be countersunk so that the heads of the fasteners 240 do not protrude outwardly beyond front surface 212a.

Mounting bracket 212 further comprises a first flange 212d and a second flange 212e that extend outwardly away from front surface 212a in a same direction r. First flange 212d and second flange 212e, as illustrated, are cut from the plate that forms mounting bracket 212. In particular, the first and second flanges 212d, 212e are die cut from a centrally-located, vertically-oriented region of mounting bracket 212. Each flange is cut is cut away from the plate on three sides but remains connected to mounting bracket 212 along one edge. In particular, first flange 212d is cut from mounting bracket 212a and is then pivoted vertically upwardly to assume a generally horizontal orientation. In this orientation, first flange 212d is oriented generally at right angles to front surface 212a. In a similar fashion, second flange 212e is cut from mounting bracket 212a and is then pivoted vertically downwardly to assume a generally horizontal orientation. In this orientation, second flange 212d is oriented generally at right angles to front surface 212a. As best seen in FIG. 17 first flange 212d and second flange 212e are generally parallel to each other and project outwardly from front surface 212a for a distance. A gap 212f (FIG. 17) is defined between a lower surface of first flange 212d and an upper surface of second flange 212e.

Figure 19:
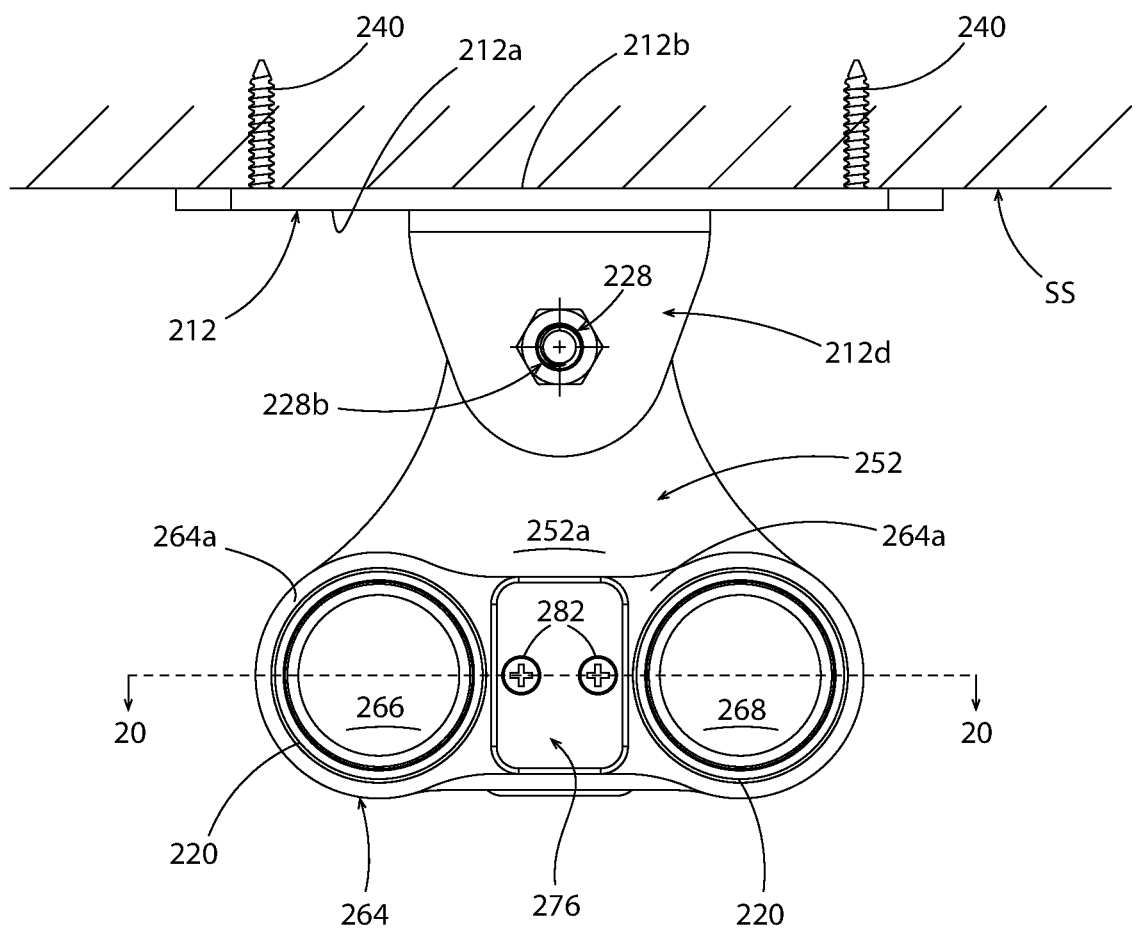
FIG. 19 is a top plan view of the isolating system of FIG. 17.

Each of the first flange 212d and second flange 212e is generally semi-circular in shape (see FIG. 19). The curved semi-circular perimeter of the flanges 212d, 212e helps to ensure that the flanges do not present sharp corners. Once first flange 212d, and second flange 212e are cut from mounting bracket 212 and are pivoted into their horizontal orientations, an opening 212g is defined in plate 212 that extends from front surface 212a through to back surface 212b. Opening 212g is illustrated as being generally rectangular in shape but it will be understood that that first flange 212d and second flange 212e may be differently shaped and then aperture 212g may accordingly be differently shaped.

First flange 212d is an upper flange that is located a distance vertically above and in alignment with second flange 212e (i.e., a lower flange). As best seen in FIG. 16, each of the flanges 212d, 212e defines a generally central hole 212d' and 212e', respectively, therein. The holes 212d', 212e' extend between the upper surface of the respective flange 212d, 212e and the lower surface thereof. Holes 212d' and 212e' are vertically aligned with one another.

Figure 20:
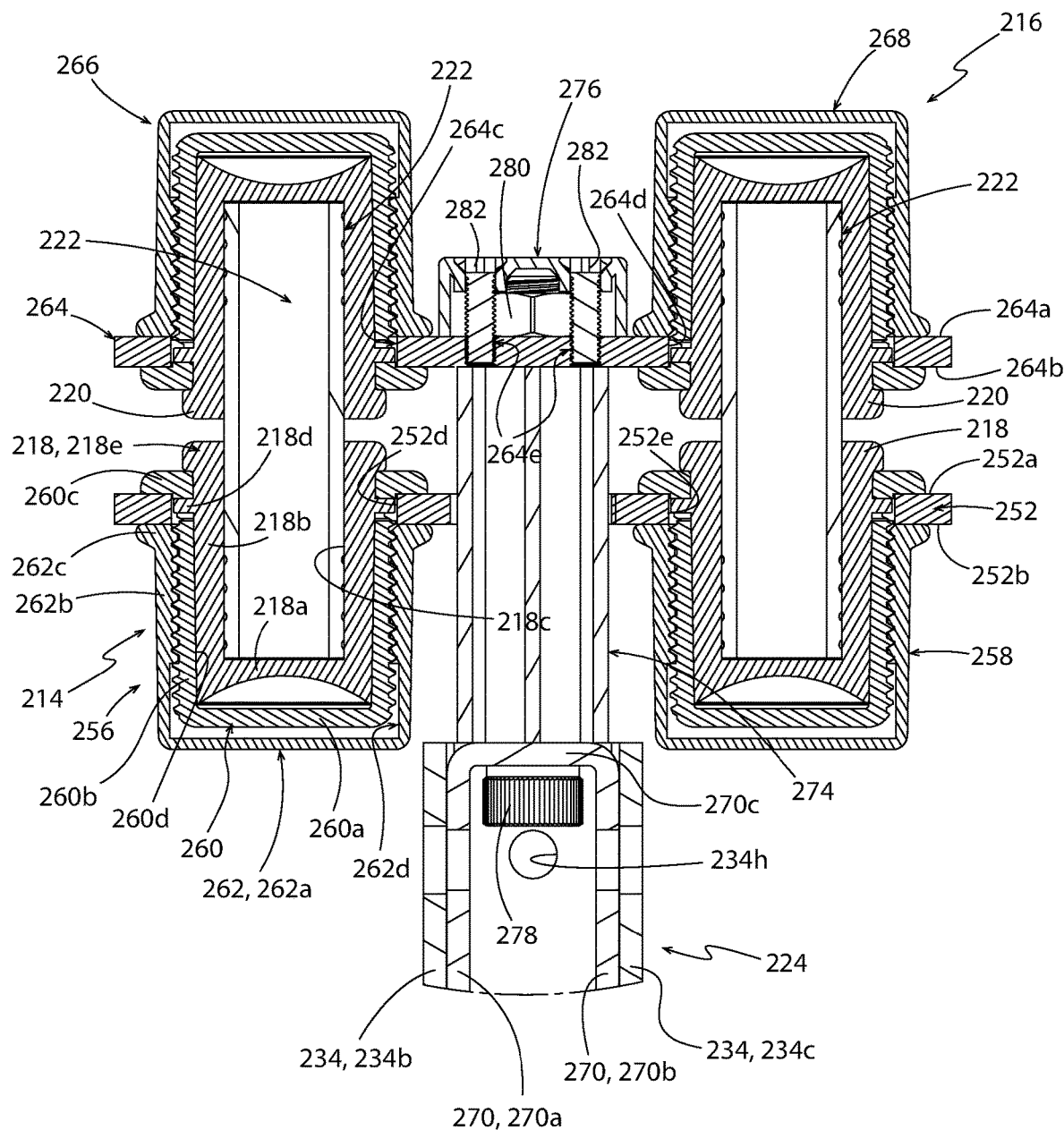
FIG. 20 is a vertical cross-section of the third embodiment isolating system taken along line 20-20 of FIG. 19.

Lower isolator assembly 214 is operatively engaged with and supported by mounting bracket 212. Lower isolator assembly comprises a plate 252, a hub member 254, and a pair of lower housings 256, 258 configured to receive first isolators 218 therein. Plate 252, as illustrated, is generally triangular in shape but it will be understood that the plate may be of any other desired shape. Plate defines three apertures and an opening therein that extend from an upper surface 252a (FIG. 20) of the plate through a lower surface 252b thereof. The apertures are arranged in a generally triangular configuration relative to one another with a first aperture 252c (FIG. 16) being longitudinally spaced a distance rearwardly of the other two apertures 252d, 252e (FIG. 20). Apertures 252d, 252e are spaced a distance laterally apart from one another and are laterally aligned with one another. The opening 252f (FIG. 16) is laterally aligned with the second and third apertures 252d, 252e and is located in a region of plate 252 between the second and third apertures 252d, 252e.

The hub member 254 is a tubular component that is shaped and sized to be complementary to the first aperture 252c. (Hub member 254 is inserted into the first aperture 252c and to be retained therein in engagement with plate 252. Hub member 254 may be configured to include an annular groove (not shown) into which the region of plate 252 which defines second aperture 252d slots, thereby securing hub member 254 and plate 252 to one another. In other embodiments, the region of plate 252 that defines second aperture 252d is secured to hub member 254 in any other manner which allows that plate 252 and any components assembled thereon to rotate in unison with hub member 254 about the vertical pivot axis "Y" (FIG. 17). For example, hub member 254 and plate 252 may be welded to one another, glued to one another, or compression fitted to one another.

Hub member 254 defines a bore 254a (FIG. 16) therethrough that originates in an opening defined in an upper surface of hub member 254 and terminates in an opening defined in a lower surface of hub member 254. Bushings 254b are inserted into the openings to the bore 254a. Hub member 254 is sized to be received in the gap 212f defined between first flange 212d and second flange 212e of mounting bracket 12. When lower isolator assembly 214 is to be engaged with mounting bracket 212, hub member 254, with bushings 254b engaged, is engaged with plate 252 as described above, hub member 254 is inserted into the gap 212f of mounting bracket 212, and is moved so as to bring through-holes 212d' and 212e' of mounting bracket 212 into alignment with the holes (not numbered) in the bushings 254b and the bore 254a of hub member 254. A pivot rod 228 is then inserted into the aligned through-holes 212d', 212e', the holes in the bushings 254b, and bore 254a. A lock washer 228a (FIG. 16) and nut 228b may be utilized to secure pivot rod 228 in place and therefore secure lower isolator assembly 214 to mounting bracket 212. A vertical axis "Y" (FIG. 17) extends along the shaft of the pivot rod 228.

Referring to FIG. 20, a first lower housing 256 and a second lower housing 258 are engaged with plate 252. First and second housings 256, 258 are identical to one another but only first lower housing 256 will be described in detail herein. It should be understood, however, that the description of the features of first lower housing 256 apply equally to second lower housing 258. First lower housing 256 comprises an insert 260 and a base 262. Insert 260 includes a cylindrical portion comprising a bottom wall 260a and a sidewall 260b that extends outwardly from an outer perimeter of bottom wall 260a. An annular flange 260c is provided at an outermost edge of sidewall 260b remote from bottom wall 260a. Bottom wall 260a and sidewall 260b bound and define an interior cavity 260d.

Sidewall 260b of insert 260 is of an exterior diameter small enough to be received through second aperture 252d of plate 252. Annular flange 260c is of an exterior diameter that is not sufficiently small enough to be received through second aperture 252d. During assembly of lower isolator assembly 214, bottom wall 260a and sidewall 260b of insert are introduced into second aperture 252d in a direction moving from upper surface 252a of plate 252 towards lower surface 252b of plate 252. Insert 260 will move downwardly through second aperture 252d until a lower surface of flange 260c contacts upper surface 252a of plate 252. It should be noted from FIG. 20 that an exterior surface of sidewall 260b of insert 260 is threaded.

Base 262 is similarly shaped to insert 260 and includes a bottom wall 262a and a sidewall 262b extend outwardly away from a perimeter of bottom wall 262a. An annular flange extends radially outwardly from an upper end of sidewall 262b. Bottom wall 262a and sidewall 262b of base bound and define an interior cavity 262d that is dimensioned to enable insert 260 to nest therein. The exterior diameter of base 262, particularly the sidewall 262b and flange 262c thereof, is greater than the internal diameter of second aperture 252d of plate 252. As a consequence, no part of base 262 is capable of passing through second aperture 252d. It should be noted that the interior surface of sidewall 262b of base is internally threaded with threads that are capable of interlocking with the threads on the exterior surface of insert 260. When insert 260 is received through second aperture 252d, Base is threadedly engaged with insert and is rotate upwardly until an uppermost surface of annular flange 262 abuts the lower surface 252b of plate 252. First lower housing 256 clamping engages plate 252 between the annular flange 260c of insert 260 and the annular flange 262c of base 262.

It should be noted in FIG. 20 that first lower housing 256 is capable of clampingly engaging different thicknesses of plates 252 between the flanges 260c, 262c of insert 260 and base 262. (The thickness of the plate 252 is measured between upper surface 252a and lower surface 252b thereof.) If the plate 252 is greater, then flange 262c of base 262 will end up being spaced further away from flange 262a of insert and a gap may be formed between the lower surface of bottom wall 260a of insert 262 and the upper surface of bottom wall 262a of base 260. If plate 252 is of a lesser thickness then the distance between flange 262c of base 262 and flange 260c of insert 260 will be smaller and the bottom wall 262a of base 262 may abut bottom wall 260a of insert 260. It will be evident that first lower housing 256 may be engaged with a wide range of plates 252 of different thicknesses.

Referring still to FIG. 20, first isolator 218 is received within the interior cavity 260d of insert 260. First isolator 218 is identical in structure and function to first isolator 18. Each first isolator 218 includes a bottom wall 218a and a cylindrical sidewall 218b that extends upwardly and outwardly away from bottom wall 218a. A central recess 218c is defined in each first isolator 218. The central recess 218c extends downwardly from an opening defined in an upper end of the first isolator 218 that is remote from bottom wall 218*b* thereof. Central recess 218*c* terminates a distance inwardly from bottom wall 218*a*. Tabs 218*d* extend radially outwardly from an exterior surface of sidewall 218*b*. Tabs 218*d*, similar to tabs 18*d* on first isolators 18 are received within slots (not numbered) defined in sidewall 260*b* of insert 260. As illustrated in FIG. 20, two opposed slots are defined in sidewall 260*b* of insert 260 and these slots are aligned with the second aperture 252*d* defined in plate 252. A small annular flange 218*e* on first isolator 218 extends a short distance radially outwardly over flange 260*c* of insert 260. The flange 218*e* may pre-exist on first isolator 218 prior to insertion thereof into the interior cavity 260*d* of insert 260 or the flange 218*e* may be created by the rest of sidewall 218*b* of first isolator 218 being compressed slightly as the first isolator 218 is press-fitted into interior cavity 260*d*. First isolators 218 are retained within the interior cavity 260*d* of insert 260 by an interference fit and by tabs 218*d* engaging in complementary slots (not numbered but shown in FIG. 20) defined in insert's sidewall 260*b*.

Referring to FIG. 20, upper isolator assembly 216 includes a support plate 264 and a pair of upper housings 266, 268. Support plate 264 is generally shaped like a figure-8 and has an upper surface 264*a* and a lower surface 264*b*. A first hole 264*c* and a second hole 264*d* are defined in opposite end regions of the figure-8 and extend between the upper and lower surfaces 264*a*, 264*b*. A pair of third holes 264*e* and a pair of fourth holes 264*f* are defined in the region of support plate 264 between first and second holes 264*c*, 264*d*. Support plate 264 is configured so as to be positioned vertically above a portion of plate 252 when upper isolator assembly 216 is engaged with lower isolator assembly 214 via connector rod 222 (FIG. 16) as will be described later herein. In particular, when this occurs, first hole 264*c* of support plate 264 is vertically aligned with second aperture 254*d* of plate 252. Similarly, second hole 264*d* of support plate 264 is vertically aligned with third aperture 254*e* of plate 252.

Upper housings 266, 268 are substantially identical in structure and function to first lower housing 256 described earlier herein. Each of the upper housings 266, 268 is engaged with support plate 264 in an identical manner to how first lower housing 256 is engaged with plate 252. First upper housing 266 includes an insert identical to insert 260 and which is received into first hole 264*c* in a direction moving a from the lower surface 264*b* of plate 264 towards the upper surface 264*a* thereof. First upper housing 266 also includes a base identical to base 262 which is threadedly engaged with the insert of first upper housing 266 in a similar manner to how base 262 of first lower housing 256 engages the insert 260 thereof. When the base of first upper housing 266 is engaged with the insert thereof, the annular flange thereof (which is identical to flange 262*c*) abuts the upper surface 264*a* of support plate 264. Second upper housing 268 is identical to first upper housing 268 and is engaged with support plate 264 in an identical manner as first upper housing 268.

Second isolators 220 are identical in structure and function to first isolators 218. Second isolators 220 are received into the interior cavities of the inserts of the first upper housing 266 and second upper housing 268 in an identical manner to how first isolators 218 are received into the interior cavity 260*d* of first lower housing 256.

Upper isolator assembly 216 and lower isolator assembly 214 are operatively engaged with each other via connector members 222. Connector members 222 may be of a similar construction to connector members 22 and therefore will not be described further herein. When upper isolator 216 is to be engaged with lower isolator assembly 214, a first end of a first connector member 222 is pressed into the recess 218*c* of each first isolator 218. The length of each connector member 222 is such that a portion thereof extends upwardly and outwardly for a distance beyond upper end 218*e* of the associated first isolator 218. Upper isolator assembly 216 is then moved downwardly into engagement with lower isolator assembly 214 such that the upper end of each connector member 222 is received into the recess of one of the second isolators 220 engaged in an associated upper housing 266 or 268. The upper isolator assembly 216 is pushed downwardly until the connector members 222 are tightly retained and captured in the two opposed recesses of the opposed first and second isolators 218, 220. A gap 232 (FIGS. 17 and 18) is defined between the first isolators 218 and second isolators 220. Gap 232 ensures that the only contact between upper isolator assembly 216 and lower isolator assembly 214 is via the resilient isolators 218, 220 and thus vibration to and from audio equipment "AE" supporting by isolating system 210 is able to be dampened.

Tilt assembly 224 is provided to operatively engage upper isolator assembly 216 with the audio equipment "AE". Tilt assembly includes a link bracket 270, a tilt bracket 234, a spacer 274, a cover 276, and a plurality of fasteners. Referring to FIG. 16, link bracket 270 comprises an inverted U-shaped having a first arm 270*a*, a second arm 270*b* that is parallel to first arm 270*a*, and a third arm 270*c* that extends between the first and second arms 270*a*, and 270*b*. First arm 270*a* defines a pair of vertically-spaced apart holes 270*a*' therein that extend between the inner and outer surfaces of the first arm 270*a*. Although not shown herein, it will be understood that second arm 270*b* similarly defines a pair of vertically spaced holes therein that extend between the inner and outer surface of the second arm 270*b*. The holes in the second arm 270*b* are horizontally aligned with the holes 270*a*' in first arm 270*a*. Third arm 270*c* also defines a pair of horizontally spaced apart holes 270*c*' therein.

Figure 4:
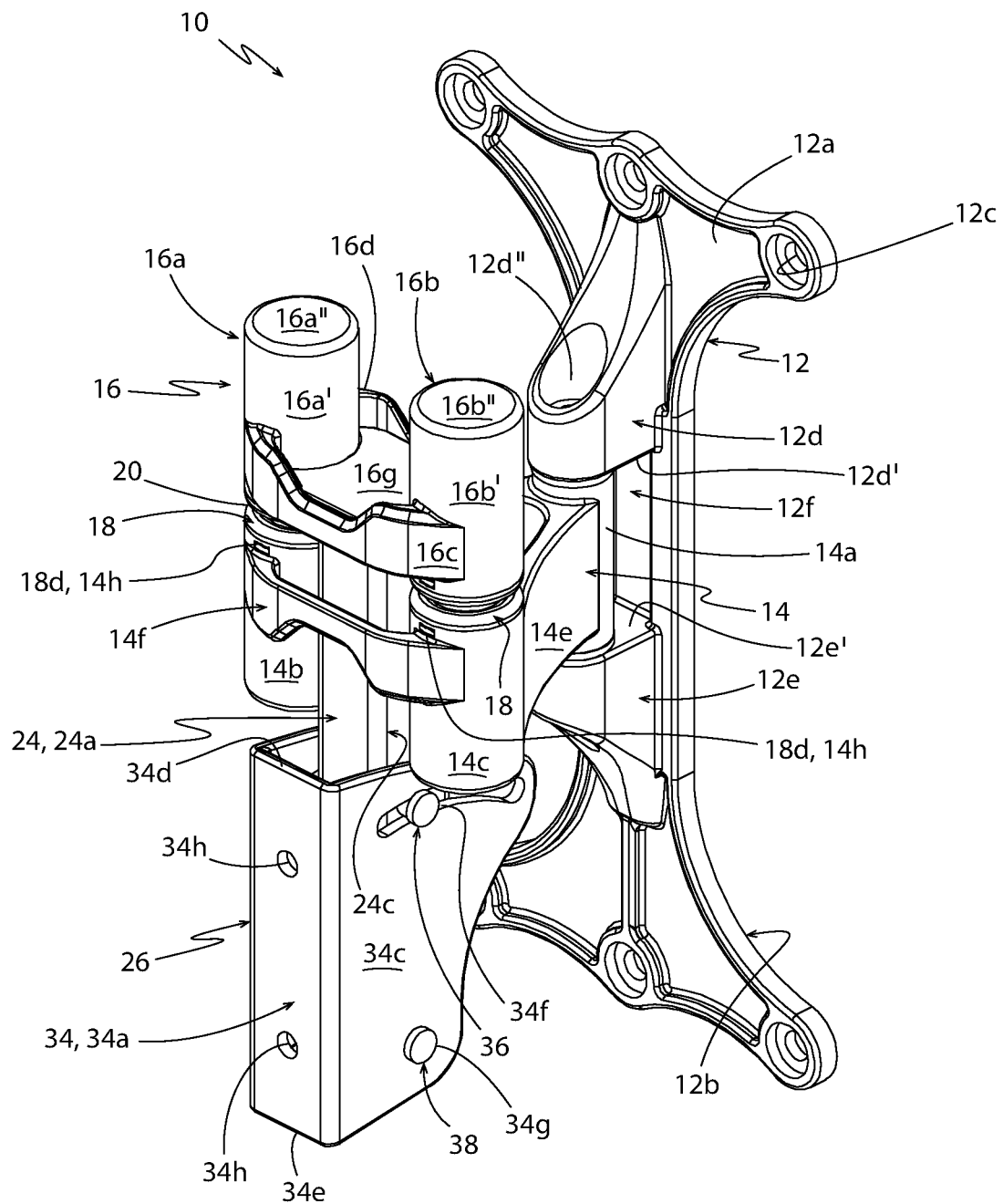
FIG. 4 is a right side, top, front perspective view of the isolating system of FIG. 2.

Referring still to FIG. 4, tilt bracket 234 is substantially identical to tilt bracket 34 of isolating system 10 and therefore will not be described in any detail further herein. Tilt bracket 234 has a front wall 234*a* and a pair of sidewalls 234*b*, 234*c*, and an interior channel (unnumbered) through which link bracket 270 extends when isolating system 10 is assembled. Tilt bracket 234 has an upper end 234*d* and a lower end 234*e*. Each of the sidewalls 234*b*, 234*c* defines an arcuate slot 234*f* and an aperture 234*g* therein. Front wall 234*a* of tilt bracket 234 defines one or more openings 234*h* therein.

Figure 15:
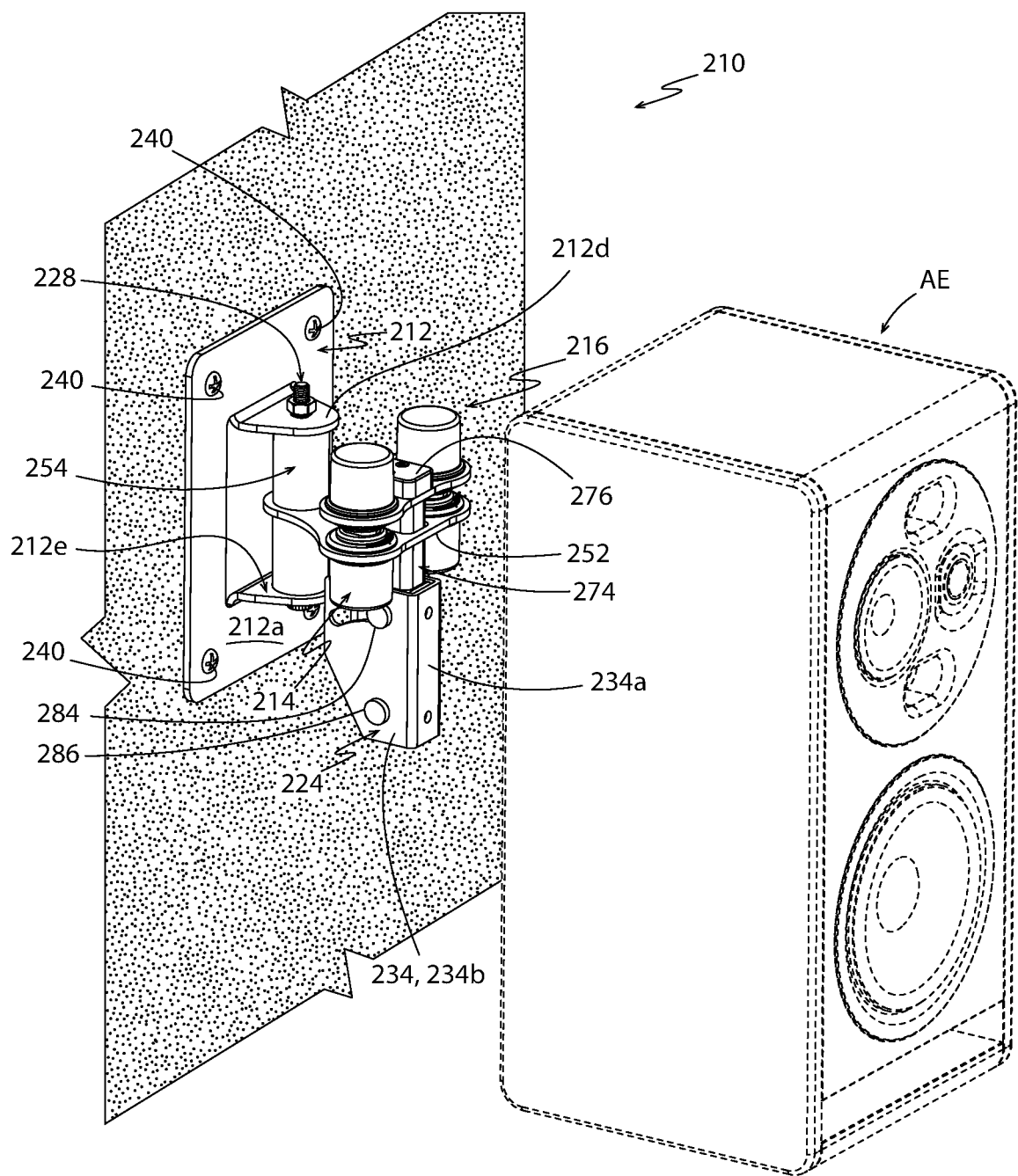
FIG. 15 is a left side, top, front perspective view of a third embodiment of a wall mounted isolating system in accordance with the present disclosure, showing audio equipment, in phantom, ready for engagement with the isolating system.

Spacer 274 (FIG. 16) is a sized to be received through fourth aperture 252*f* of plate 252 as best illustrated in FIG. 15 but it should be noted that the dimensions of spacer 274 are such that no contact is made between spacer 274 and any part of plate 252. As shown in FIG. 16, spacer 274 is a block of material having an upper end 274*a* and a lower end 274*b*. Two spaced apart through-holes 274*c* are defined in the block of material and extend from an opening in upper end 274*a* to an opening in lower end 274*b*. Holes 274*c* are located so as to be vertically aligned with the pair of fourth holes 264*c* defined in support plate 264 and are further located to be vertically aligned with the holes 270*c*' of link bracket 270. Spacer 274 is received between the two vertically aligned pairs of laterally spaced-apart housings 256, 266 and 258, 268 of the upper and lower isolator assemblies 216, 214

Cover 276 (FIG. 20) is received between the laterally spaced apart second housings 266, 268. Cover 276 is a box-like component having has an upper wall 276*a* and a sidewall 276b extending downwardly from a perimeter of the upper wall 276a. Upper wall 276a defines two spaced-apart holes 276c therein. Holes 276c are located so as to be alignable with the pair of third hole 264e defined in support plate 264, as will described later herein.

Tilt assembly 224 is engaged with upper and lower isolator assemblies 214, 216 in the following manner. Spacer 274 is inserted through fourth aperture 252f defined in plate 252 of lower isolator assembly 214. Third arm 270c of link bracket 270 is placed in abutting contact with lower end 274b of spacer 274 and so that the holes 270c' in third arm 270c are aligned with the holes 274c defined in spacer 274. Fasteners 278 are inserted through the aligned holes 270c', 274c, and are further inserted through the pair of fourth holes 264f defined in support plate 264 of upper isolator assembly 216. Nuts 280 are engaged with fasteners 278 to keep support plate 264 engaged with spacer 274 and link bracket 270 as shown in FIG. 20. Cover 276 is positioned over the free ends of fasteners 278 and nuts 280 which extend beyond the upper surface 264a of support plate 264. Fasteners 282 are inserted through the holes 276c defined in upper wall 276a of cover 276 and into third holes 264e (FIG. 20) defined in support plate 264. Fasteners 282 secure cover 276 to support plate 264 and hide the free ends of fasteners 278 and nuts 280.

Tilt bracket 234 is placed around link bracket 270. (The gap defined between first leg 234a and second leg 234b of tilt bracket 234 is sufficient to enable link bracket 270 to be received therein.) Tilt bracket 234 is pushed inwardly toward the link bracket 270 until slots 234f' are aligned with the upper hole 270a' in link bracket 270 and apertures 234g aligned with the lower hole 270a' in link bracket 270. Tilt fasteners 284 and 286 are inserted through these aligned slots and holes in the tilt bracket 234 and link bracket 270 to secure tilt bracket 234 to link bracket 270.

When isolating system 210 is to be used, the rear surface 212b of mounting bracket 212 is placed against a flat surface, such as support surface "SS" (FIG. 15) and fasteners 240 are inserted into apertures 212c and are secured to support surface "SS". Tilt bracket 234 is disengaged from isolating system 210 by removing fasteners 284, 286 therefrom. Tilt bracket 234 is secured to audio equipment "AE" by placing front wall 234a in abutting contact with a rear wall of the audio equipment "AE" and inserting fasteners 288 (FIG. 22) through apertures 234h (FIG. 18) defined in front wall 234a of tilt bracket 234 and the rear wall of the audio equipment "AE". Audio equipment "AE" is then engaged with isolating system by slipping tilt assembly 234 back over link bracket 270 and reinstalling the fasteners 284 286. As indicated earlier herein, the full weight of audio equipment "AE" is supported by upper isolator assembly 216.

Figure 21:
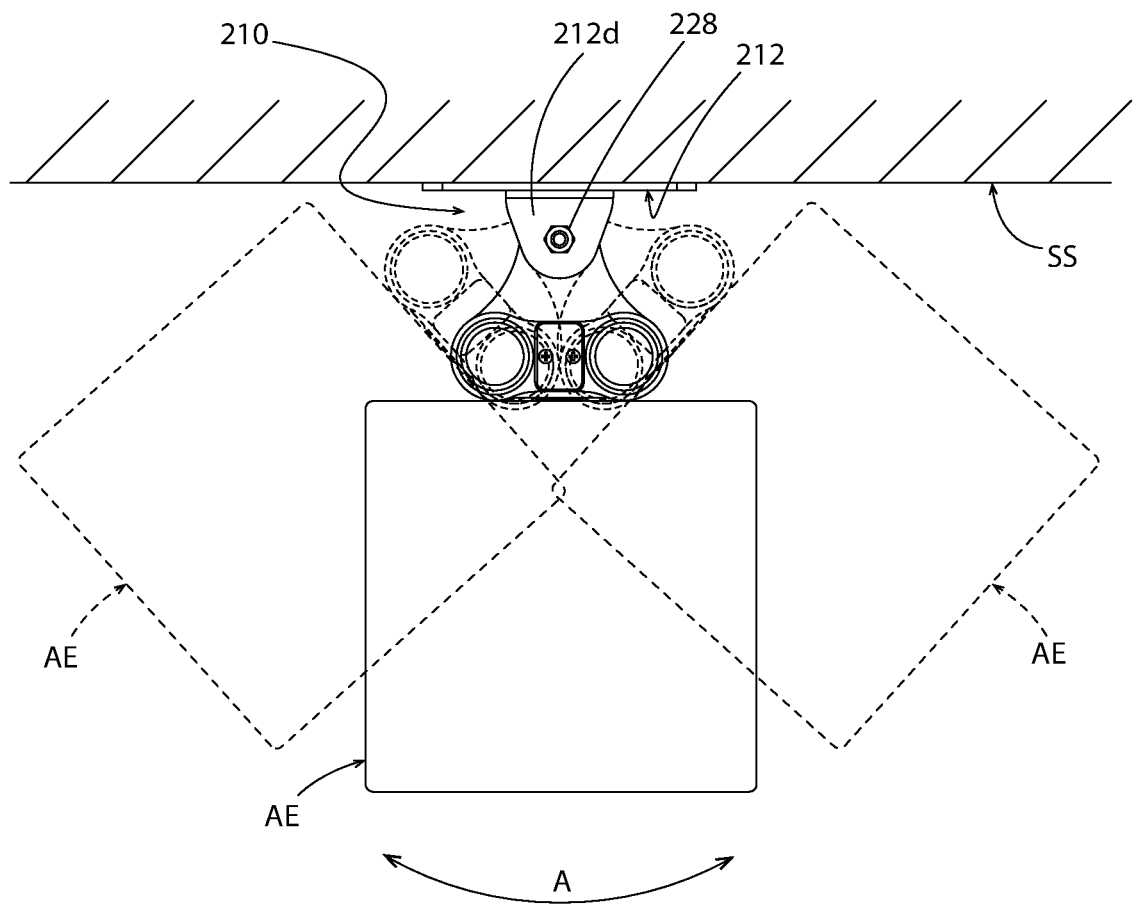
FIG. 21 is a top plan view showing audio equipment engaged with the wall mounted isolating system of FIG. 17 and showing the pivotal panning motion of the audio equipment in a horizontal plane, where the pivotal motion occurs about a vertical axis.

When isolating system 210 is assembled in the above manner it will be understood that it is possible to pivot the upper isolator assembly 216, lower isolator assembly 214, and tilt assembly 224 in unison with hub member 254 in a horizontal plane about the longitudinal axis "Y" as illustrated in FIG. 21. Consequently, when audio equipment "AE" is engaged with isolating system 210, it is possible to adjust the position of the audio equipment "AE" in the horizontal plane. This adjustment is undertaken by loosening fastener 228, pushing the audio equipment "AE" about the pivot axis "Y" to the left or right of a central position in order to orient the audio equipment "AE" relative to the support surface "SS" as desired by the user, and then retightening fastener 228 to maintain the audio equipment's orientation. The possible pivotal motion of the audio equipment "AE" in the horizontal plane is indicated by arrow "A" in FIG. 21.

Figure 22:
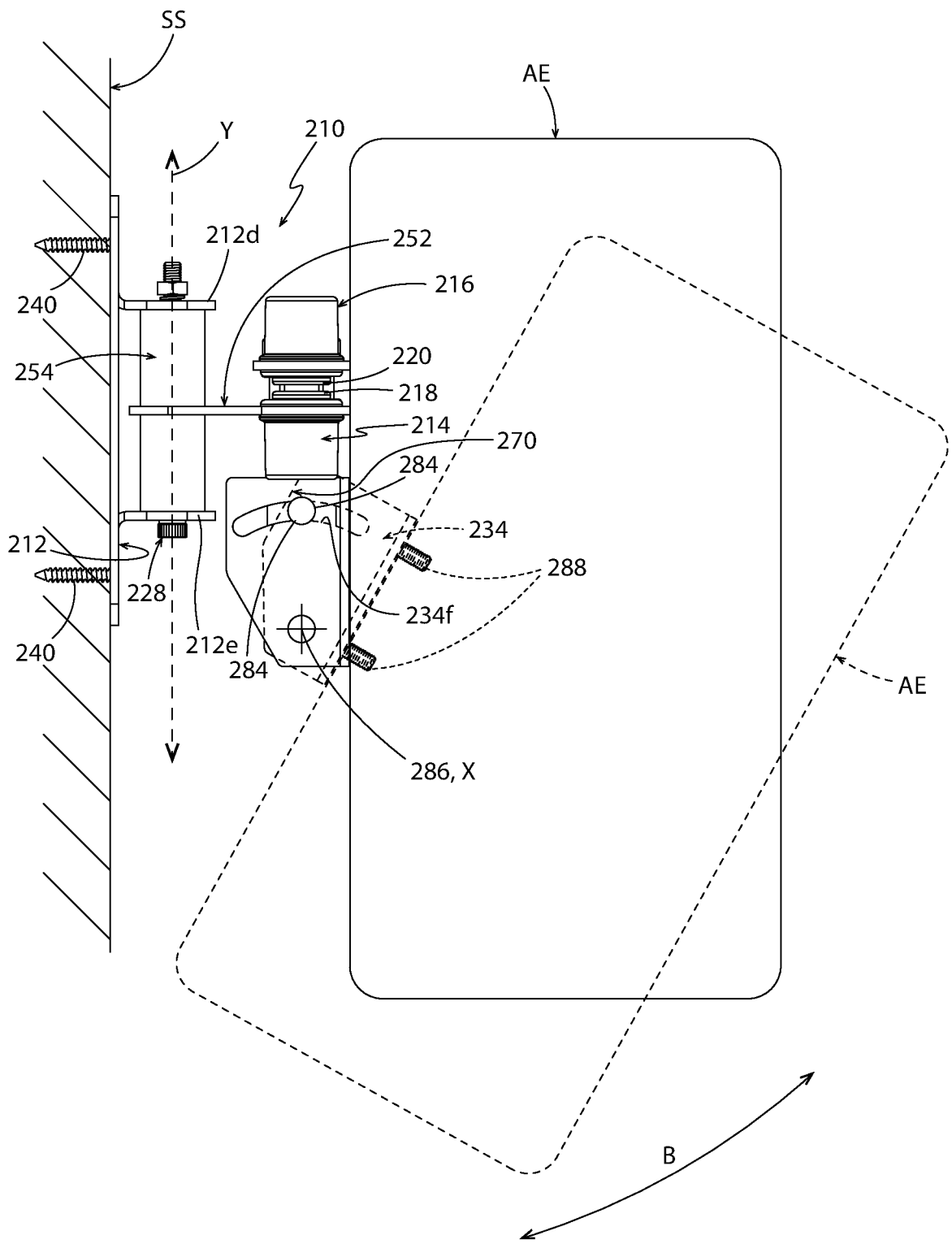
FIG. 22 is a left side elevation view showing the audio equipment engaged with the wall mounted isolating system of FIG. 17, and showing a possible tilt motion of the audio equipment in a vertical plane, where the tilt motion occurs about a horizontally-oriented tilt axis.
Figure 23:
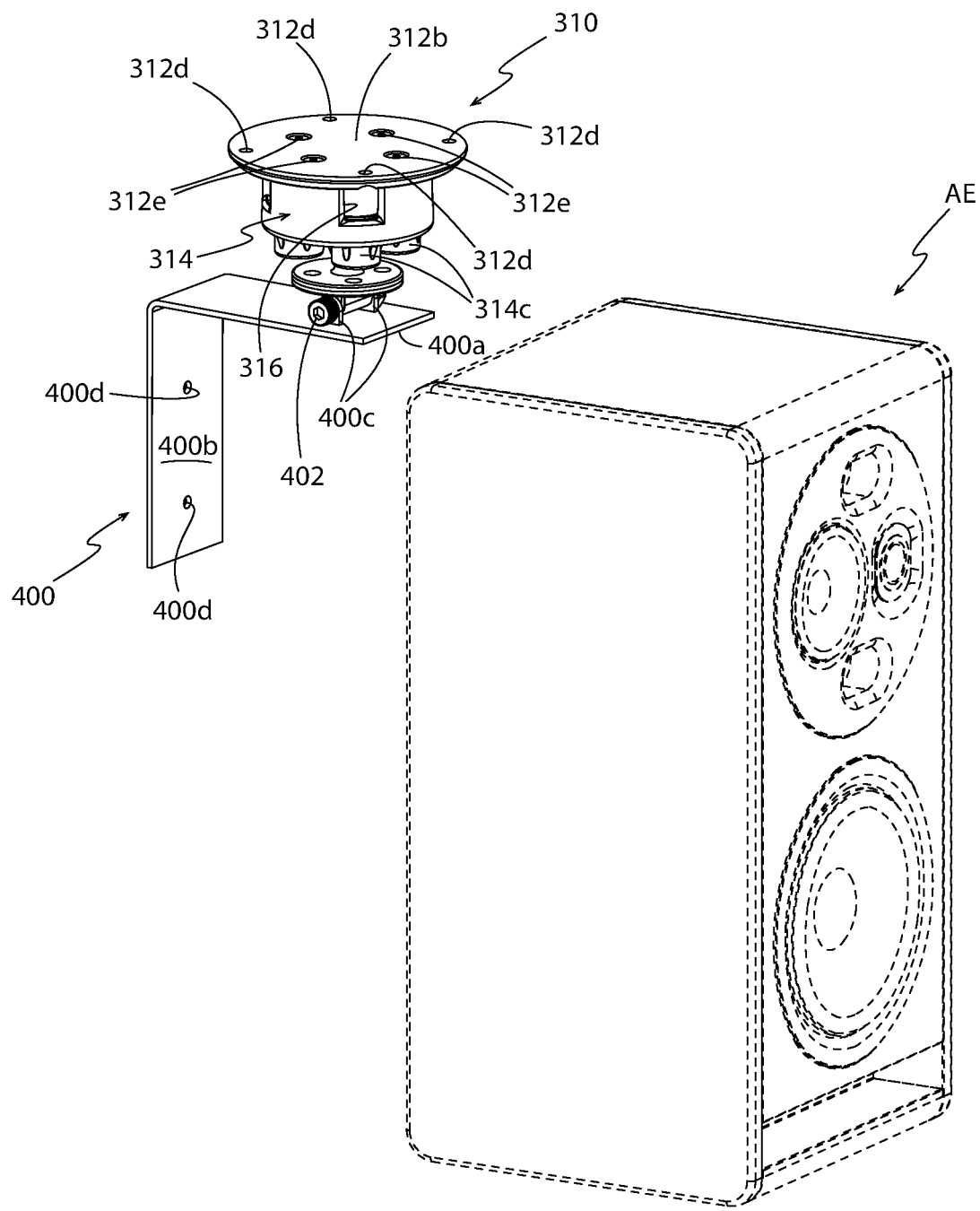
FIG. 23 is a left side, top, front perspective view of a fourth embodiment of an isolating system in accordance with the present disclosure, shown positioned for mounting on a ceiling and illustrating audio equipment, in phantom, ready for engagement with the isolating system.

Isolating system 210 also enables the audio equipment "AE" to be tilted in a vertical plane about a tilt axis "X" (FIG. 22). The tilt axis "X" extends along the shaft of the lower fastener 286 which secures the tilt bracket 234 to the link bracket 270. In order to tilt the audio equipment "AE", upper fastener 284 is loosened and the user will pull gently downwardly on the audio equipment "AE" or will gently push upwardly on the audio equipment "AE". The possible range of tilting motion of the audio equipment "AE" is shown by the arrow "B" in FIG. 22.

When audio equipment "AE" is supported by isolating system 210, vibration from the audio equipment will pass through tilt bracket 234, into the upper isolator assembly 216, through second isolators 220, through connector members 222 and into the first isolators 218 of lower isolator assembly 214. As the vibration is transferred in this manner, the resilient isolators 218, 220 will dampen vibrations, thereby preventing vibration from being transferred to the lower isolator assembly 214 and thereby to mounting bracket 212 and support surface "SS". It will be understood that any vibration from the support surface "SS" will also be dampened by the resilient isolators 218, 220 and will therefore not be transferred to the audio equipment "AE".

Figure 27:
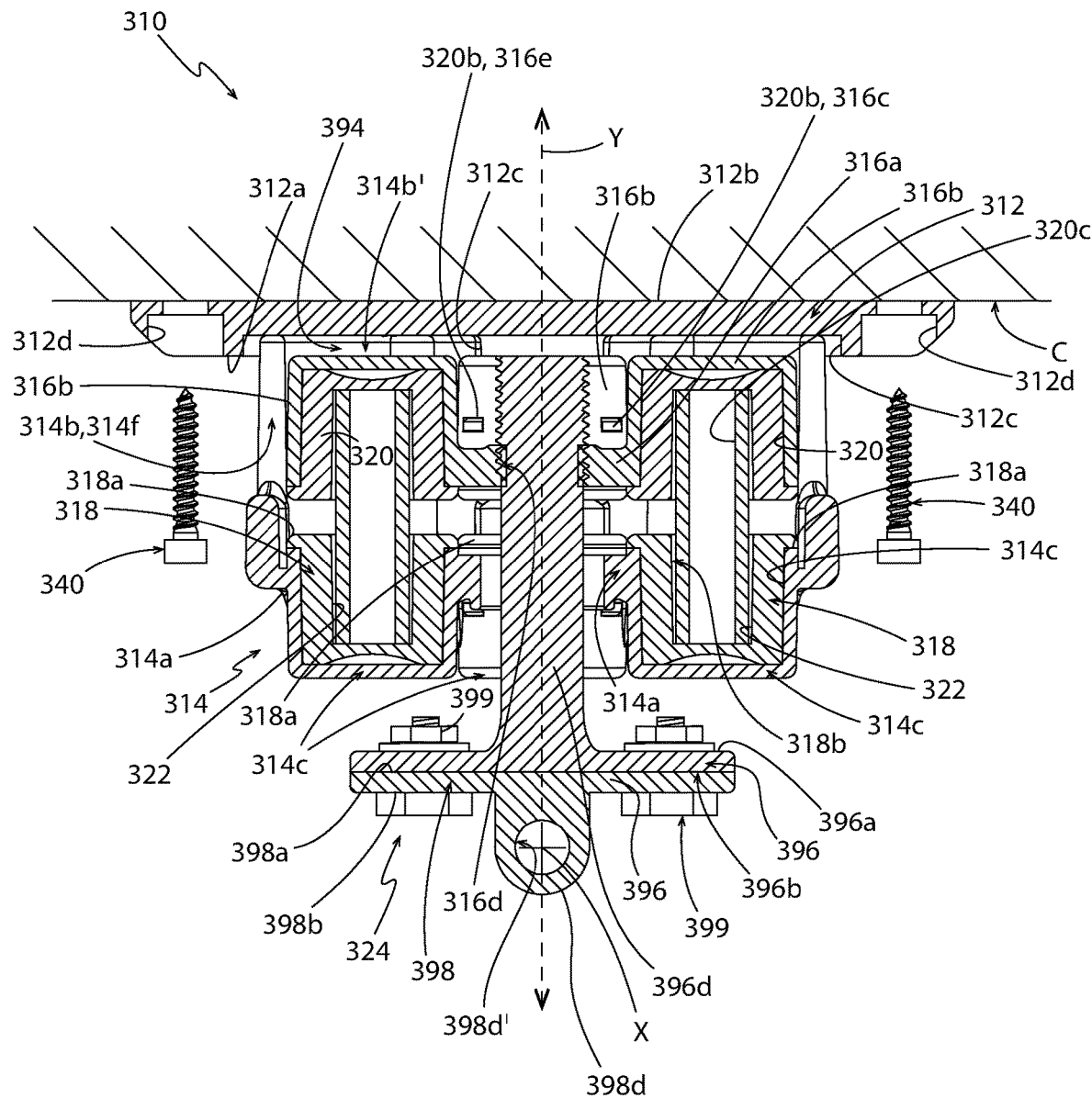
FIG. 27 is a vertical cross-section of the isolating system taken along line 27-27 of FIG. 26.
Figure 28:
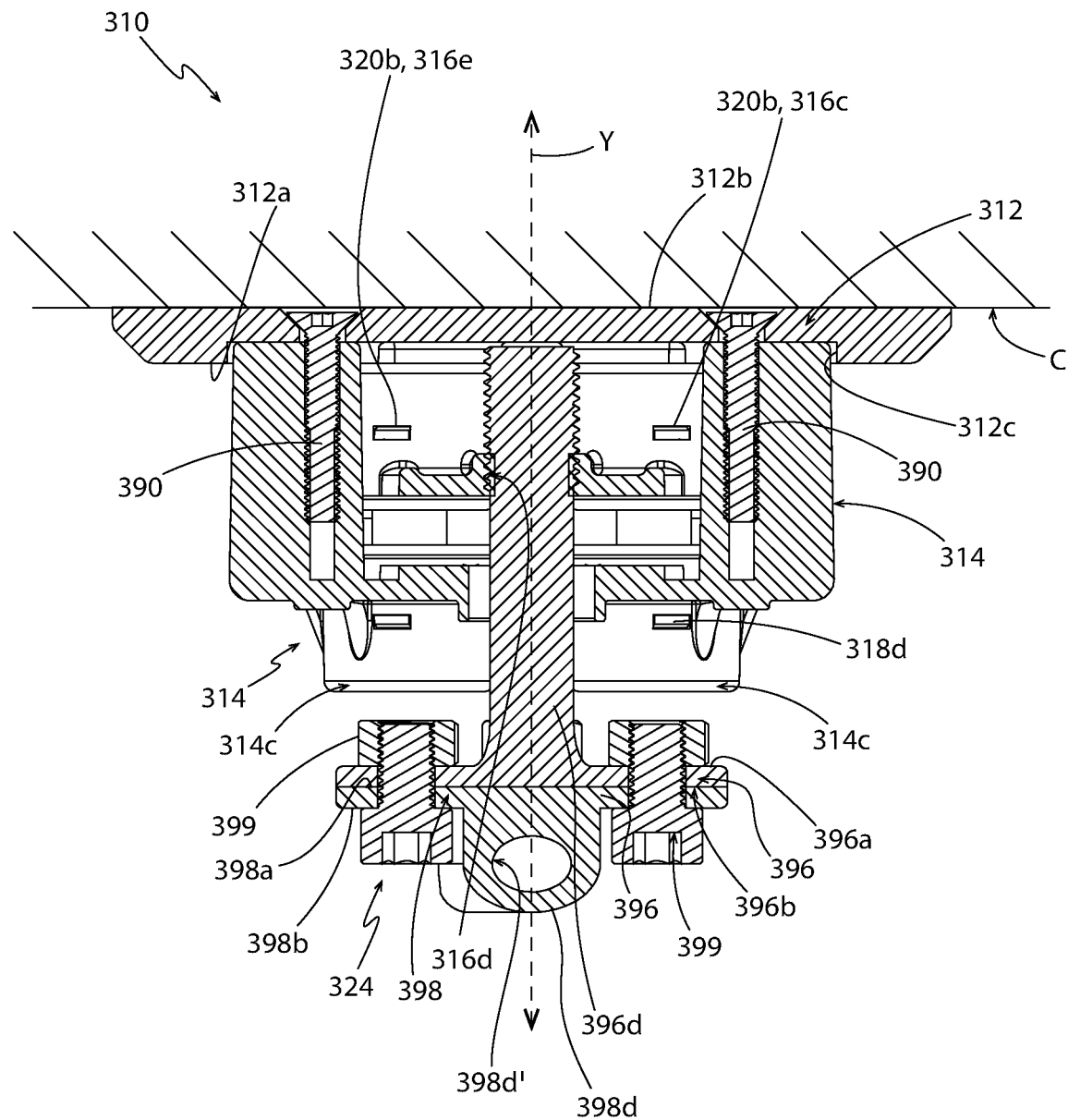
FIG. 28 is a vertical cross-section of the isolating system taken along line 28-28 of FIG. 26.
Figure 29:
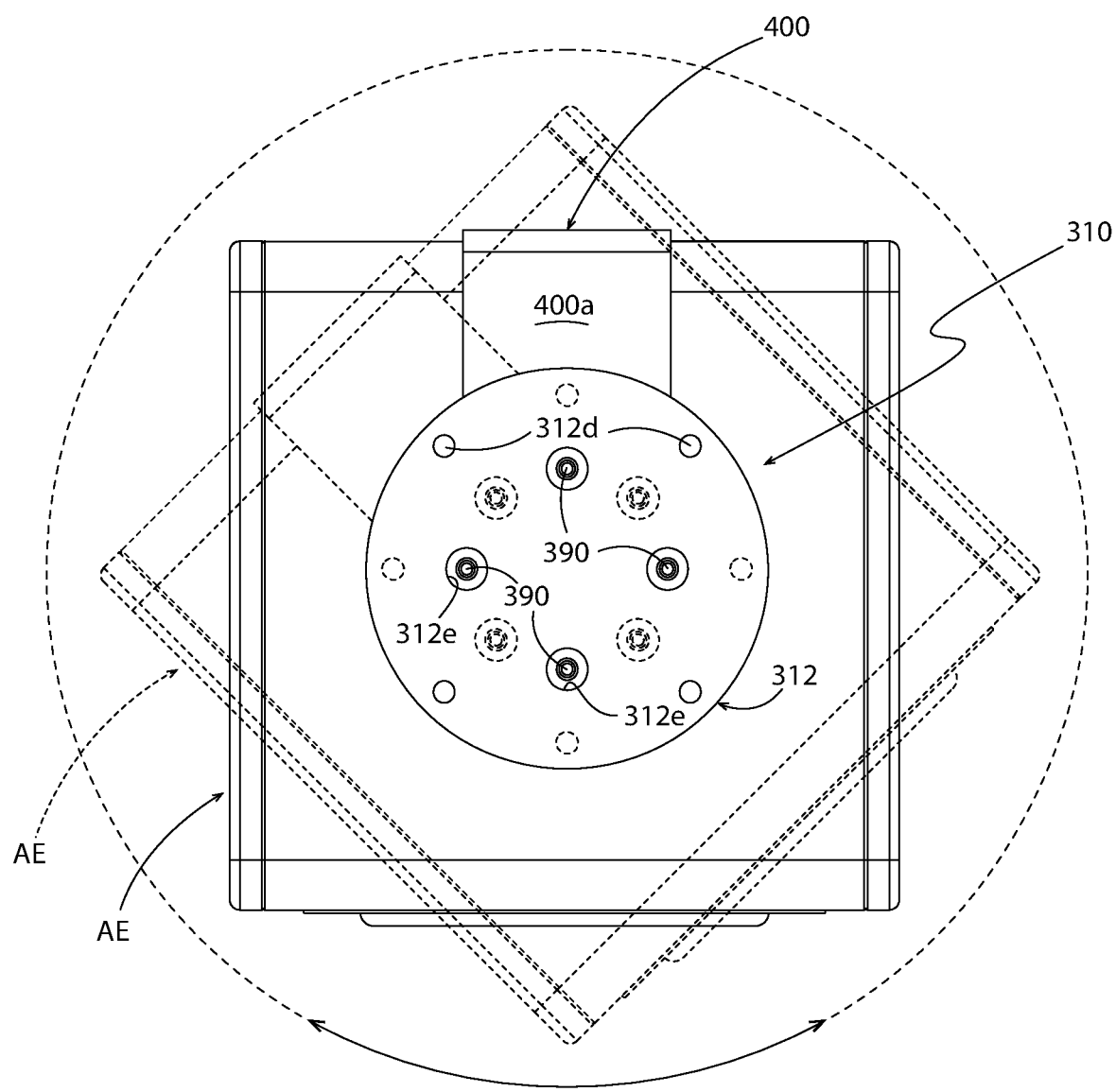
FIG. 29 is a top plan view of the isolating system of FIG. 24 showing audio equipment engaged therewith and showing the possible rotation of the audio equipment about a vertical axis.
Figure 30:
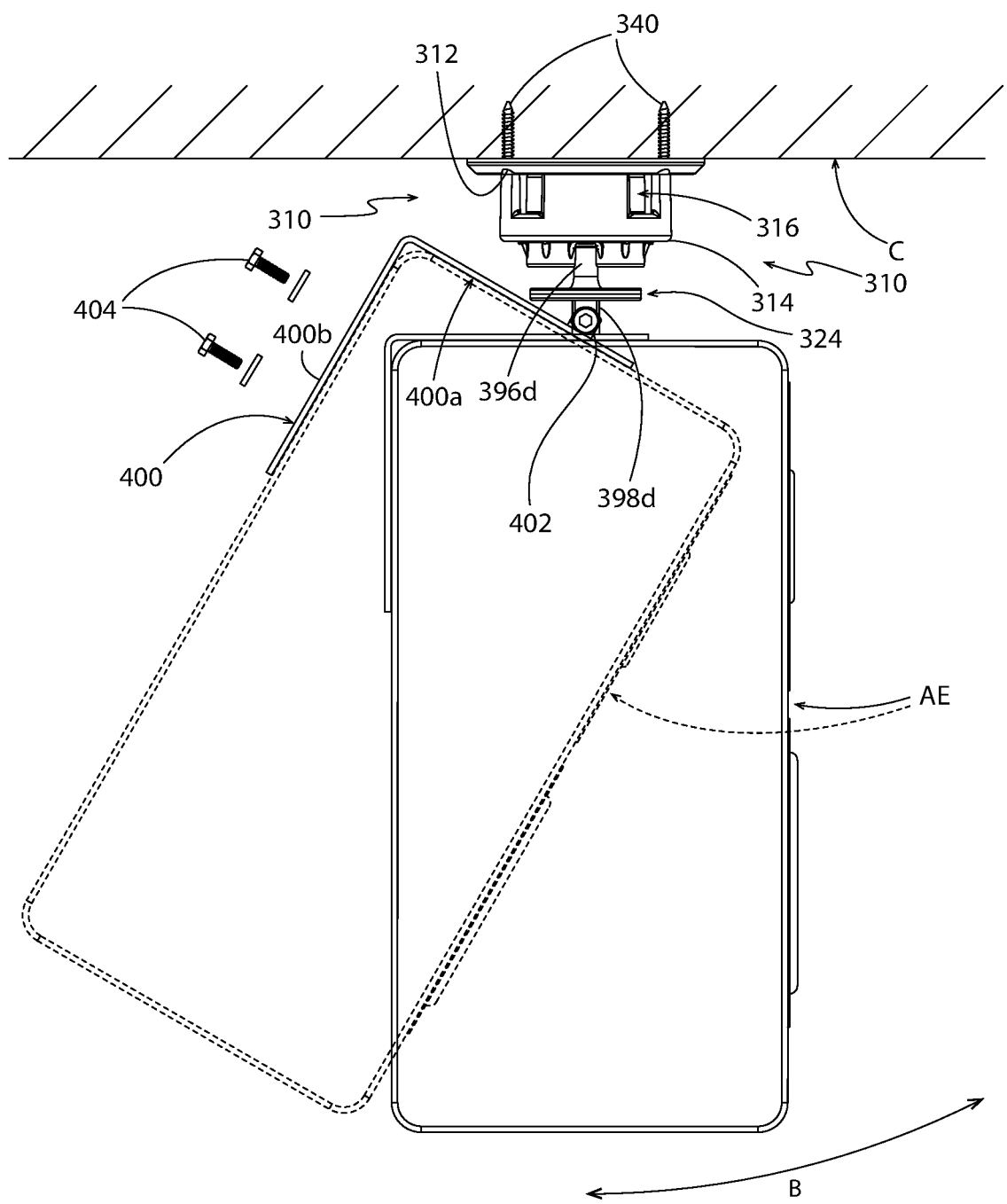
FIG. 30 is a left side elevation view of the isolating system of FIG. 24 showing audio equipment engaged therewith and showing the possible tilting of the audio equipment about a horizontal axis.

Referring to FIGS. 23 to 30 there is shown a fourth embodiment of an isolating system, generally indicated at 310. Isolating system 310 is configured to be secured to a horizontally-oriented support surface such as a ceiling "C" (FIG. 27). Isolating system 310 suspends the audio equipment "AE" from the ceiling "C" as shown in FIG. 30 and bears the full weight of the audio equipment.

Figure 25:
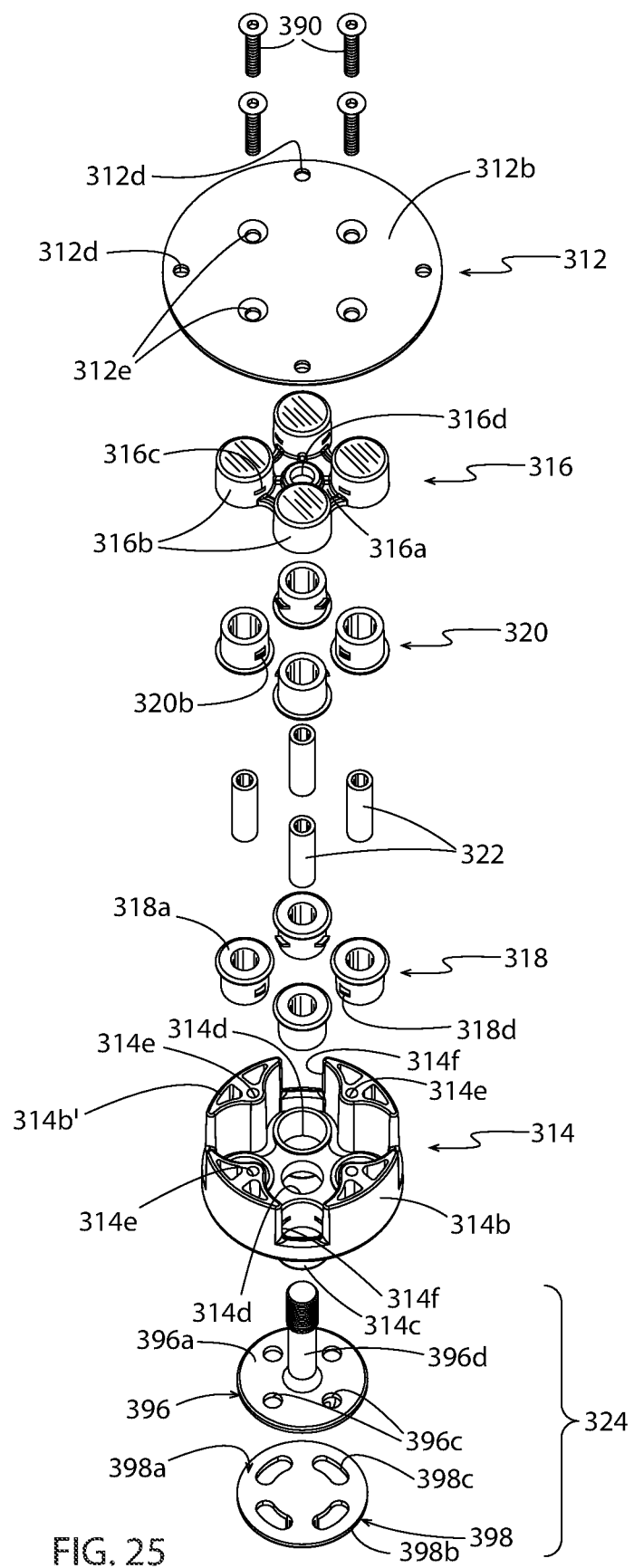
FIG. 25 is an exploded left side, top, front perspective view of the isolating system of FIG. 24.
Figure 26:
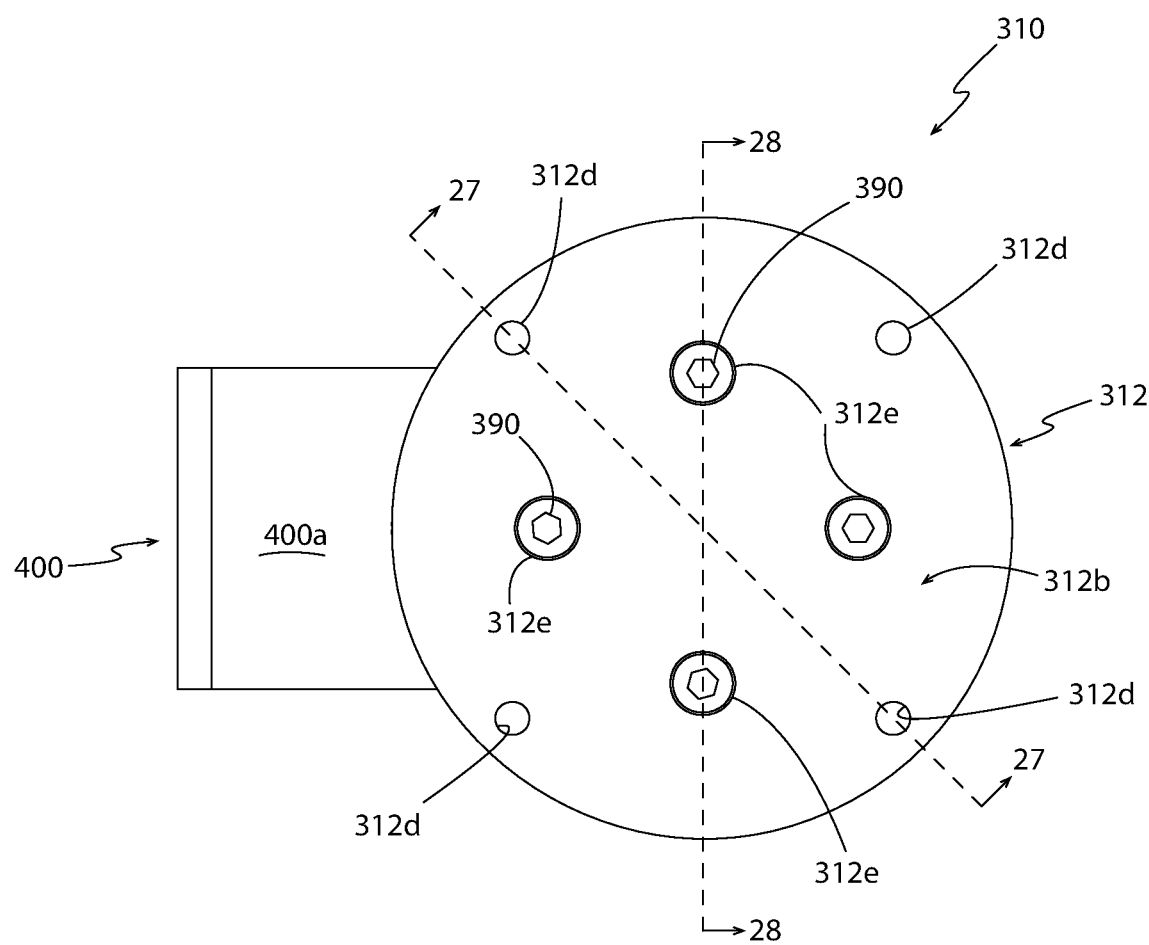
FIG. 26 is a top plan view of the isolating system of FIG. 24.

Referring particularly to FIG. 25, isolating system 310 includes a mounting bracket 312, a lower isolator assembly 314, an upper isolator assembly 316, a plurality of first isolators 318, a plurality of second isolators 320, and a plurality of connector members 322. First isolators 318, second isolators 320, and connector members 322 are substantially identical in structure and function to first isolators 18, 118, 218; second isolators 20, 120, 220; and connector rods 22, 122, 222, and therefore will not be described in any detail herein.

Mounting bracket 312 comprises a plate having a lower surface 312a (FIGS. 27 and 28), and an upper surface 312b. Lower surface 312a defines a plurality of depressions 312c therein and into which an upper portion of upper isolator assembly 316 is received. Upper isolator 316 includes a plurality of generally circular housings, each housing being received within one of the depressions 312c of mounting bracket 312. This arrangement will be discussed further later herein. The depressions 312c defined in lower surface 312a of mounting bracket 312 are arrangement in a complementary number and pattern to the number and configuration of the housings provided on upper isolator 316. Mounting bracket 312 defines a plurality of first openings 312d (FIG. 23) and a plurality of second openings 312e. Each of the first openings 312d and second openings 312e extends between the lower surface 312a and upper surface 312b of mounting bracket 312. As is evident from FIG. 27, when isolating system 310 is engaged with the ceiling "C", fasteners 340 are inserted through first openings 312d and are secured to ceiling "C". The purpose of second openings 312e will be discussed later herein.

Referring to FIGS. 24, 25, 27, and 28, lower isolator assembly 314 is a cast component that includes a bottom wall 314a. A plurality of wedge-shaped segments extend upwardly and outwardly from bottom wall 314a. The wedge-shaped segments have an arcuate outermost surface that comprises a sidewall 314b. The sidewall 314b terminates in an upper edge 314b' (FIGS. 25 and 27) that is locate a remote from bottom wall 314a. A plurality of tubular members 314c extend downwardly away from a lower surface of bottom wall 314a. Bottom wall 314 defines a central aperture 314d (FIG. 24) around which the plurality of tubular members 314c are arranged. Central aperture 314d extends between an upper surface and the lower surface of bottom wall 314a. A wedge-shaped region is interposed between adjacent tubular members 314c in a direction moving circumferentially around central aperture 314d.

An opening 314e is defined in each wedge-shaped region and the opening extends from upper edge 314b' down to a lower surface of bottom wall 314a. Each opening 314e is located so as to align with second openings 312e in mounting bracket 312 when isolating system 310 is assembled. Additional cavities (not numbered) are defined in each wedge shaped-region with each cavity extending inwardly from upper edge 314b' inwardly towards bottom wall 314b but terminating a distance from bottom wall 314b. These additional cavities are provided to reduce the amount of material required to fabricate lower isolator assembly 314. It will be understood that in some embodiments, the additional cavities may be omitted.

A plurality of windows 314f is defined in sidewall 314b. Each window 314f radially aligns with a location of one of the plurality of tubular members 314c, i.e., in locations intermediate the wedge-shaped regions. Each window 314f originates a short distance upwardly from the bottom wall 314b and extends upwardly to proximate the upper edge 314b'. Windows 314f reduce the quantity of material required to fabricate lower isolator assembly 314 and also provide a decorative element to isolating system 310.

Resilient first isolators 318 are each press-fitted into one of the plurality of tubular members 314c provided in lower isolator assembly 314. This can be seen particularly in FIGS. 27 and 28. As is evident from FIG. 27, the body of each first isolator 318 is interferencingly fitted into the bore 314c' of one of tubular members 314c. A portion of each first isolator 318 extends outwardly beyond bottom wall 314a and forms an annular flange 318a that extends radially outwardly away from the associated tubular member 314c along an inner surface of bottom wall 314a. Each first isolator 318 also defines a recess 318b therein (FIG. 27), the purpose of which will be discussed later herein.

FIG. 25 shows that each first isolator 318 includes at least one tab 318d which extends radially outwardly from the sidewall of the first isolator 318, in a manner identical to first isolators 18 with associated tabs 18d. Although not illustrated herein, it will be understood that the plurality of tubular members 314c defined in lower isolator assembly 314 will be provided with at least one complementary slot to receive the at least one tab 318d therethrough and to thereby secure first isolator 318 in place within tubular member 314c.

Referring now to FIGS. 25, 27, and 28, upper isolator assembly 316 is a cast component which comprises a plate 316a and a plurality of cylindrical members 316b that extend upwardly from an upper surface of the plate 316a. The number and placement of cylindrical member 316b provided on plate 316a is complementary to the number and placement of tubular members 314c provided on plate 314a. Each cylindrical member 316b defines an interior cavity 316b' therein and one of a plurality of second isolators 320 is press-fitted into the interior cavity 316b', as illustrated in FIG. 27.

FIG. 25 shows that each second isolator 320 includes at least one tab 320b which extends radially outwardly from the sidewall (not numbered) of the second isolator 320, in an identical manner to second isolators 20 with associated tabs 20b. It will be understood that the plurality of cylindrical members 316b defined in upper isolator assembly 316 will be provided with at least one complementary slot 316c to receive the at least one tab 320b therethrough and thereby to secure second isolator 320 in place within cylindrical member 316b. Two of the tabs 320b can be seen in FIG. 27

As best seen in FIG. 27, plate 316a of upper isolator assembly 316 also defines a central aperture 316d therein which extends from an upper surface of plate 316a to a lower surface thereof. The portions of the plate which bound and define central aperture 316d are threaded, for reasons which will be explained hereafter.

When isolating system 310 is assembled, first ends of the connector members 322 are inserted into the recesses 318b defined by first isolators 318. Upper isolator assembly 316 is positioned over lower isolator assembly 314 so that the second ends of the connector members 322 are received into recesses 320c defined in second isolators 320. Upper isolator assembly 316 is pushed downwardly towards lower isolator assembly 314 until further downward movement is halted by the first and second ends of connector members 322 connecting the bottom wall (not numbered) of both the first isolators 318 and second isolators 320.

Figure 24:
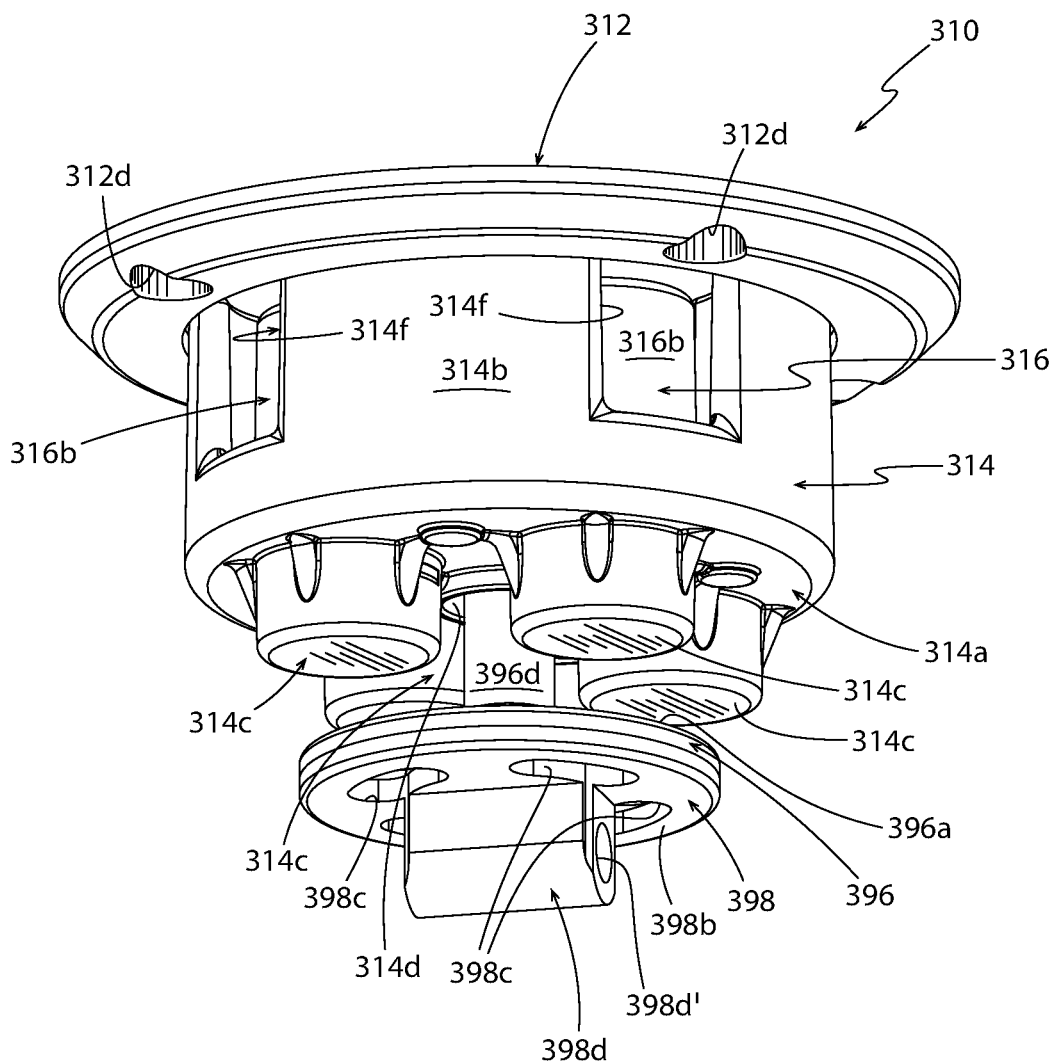
FIG. 24 is a left side, bottom, front perspective view of the isolating system of FIG. 24 in accordance with the present disclosure and shown in isolation.

Fasteners 390 (FIG. 25) are then inserted through the second openings 312e defined in mounting bracket 312. In particular, fasteners 390 are inserted in a direction moving from upper surface 312b downwardly towards lower surface 312a. It should be noted from FIG. 26 that the second openings 312e are countersunk so that the heads of fasteners 390 will not protrude above the upper surface 312b of mounting bracket 312 when mounting bracket 312 and lower isolator assembly 314 are secured to one another. Fasteners 390 exit mounting bracket 312 and are received into openings 314e defined in lower isolator assembly 314. The surface defining openings 314e in lower isolator assembly 314 is internally threaded and configured to threadedly engage fasteners 390 to lower isolator assembly 314. When fasteners 390 are full engaged with lower isolator assembly 314 a free end of each fastener 390 may be visible where openings 314e exit the lower surface of bottom wall 314a of lower isolator assembly. This is shown in FIG. 24.

It should be noted that when lower isolator assembly 314 and mounting bracket 312 are secured to one another, there is a clearance gap 394 (FIG. 27) between the uppermost surfaces of the cylindrical members 316b of upper isolator assembly 316 and the lower surface 312a of mounting bracket 312. There is therefore no contact between upper isolator assembly 316 and mounting bracket 312. Additionally, the only contact between upper isolator assembly 316 and lower isolator assembly 314 is via the resilient first isolators 318 and second isolators 320 and the connector members 322.

Upper isolator assembly 316 is provided with a support arm 324 (FIG. 25) for engaging audio equipment "AE" thereto. Support arm 324 includes an upper plate 396, and a lower plate 398. Upper plate 396 and lower plate 398, as illustrated, are circular in shape when viewed from above. It will be understood, however, that these plates could be shaped other than circular. FIG. 27 shows that upper plate 396 has an upper surface 396a and a lower surface 396b. A plurality of holes 396c is defined in plate 396 and each hole 396c extends from upper surface 396a through to lower surface 396b. A post 396d extends upwardly from upper surface 396a for a distance. Post 396d is centrally located on upper surface 396a. As best seen in FIG. 27, the post 396d is an integrally formed part of plate 396. A circumferential surface of post 396d proximate a free end thereof (i.e., remote from upper surface 396a of plate 396) is provided with threads. The diameter of post 396d is complementary to the diameter of the central aperture 316d of plate 316a of upper isolator assembly 316. The threaded region of post 396d is threadedly engageable with the threads that circumscribe central aperture 316d. Once mounting bracket 312, lower isolator assembly 314 and upper isolator assembly 316 have been engaged with one another as previously described herein, upper plate 396 may be engaged with upper isolator assembly 316 by inserting the free end of post 396d into central aperture 316d and rotating upper plate 396 about an vertical axis "Y" that extends along the post 396d.

Referring still to FIG. 27, lower plate 398 has an upper surface 398a and a lower surface 398b. A plurality of arcuate slots 398c are defined in lower plate 398, with each slot 398c extends between upper surface 398a and lower surface 398b. A plurality of fasteners 399 are utilized to secure lower plate 398 to upper plate 396. In particular, fasteners 399 are received through the aligned slots 396c and holes 396c. The arcuate slots 398c allow a user to selectively rotationally orient lower plate 398 relative to upper plate 396, as will be described later herein. In order for such rotational adjustment to occur, nuts of the fasteners 399 are loosened, lower plate 398 is rotated about the longitudinal axis "Y" that extends along post 396d to the desired position, and then the nuts are retightened.

Referring still to FIG. 27 and to FIG. 24, a sleeve 398d is integrally formed with lower plate 398. In particular, sleeve 398d extends downwardly from lower surface 398b of lower plate 398. Sleeve 398d defines a bore 398d' therethrough that extends from an opening in one end of sleeve 398d to an opening in the other end of sleeve 398d. Bore 398d' is oriented at right angles to longitudinal axis "Y". This is best seen in FIG. 27.

A user is able to secure audio equipment "AE" to upper isolator assembly 316 of isolating system 310 using an L-shaped bracket 400, for example. (It will be understood that the bracket used to secure the audio equipment to the upper isolator assembly 316 will be configured to be suitable for the specific audio equipment. The L-shaped bracket 400 discussed herein and illustrated in the attached drawings should be understood to be exemplary only.) L-shaped bracket 400 has a first leg 400a and a second leg 400b that are oriented at right angles to one another. First leg 400a has a pair of laterally-spaced apart flanges 400c that extend upwardly from an upper surface of the first leg 400a. Each flange 400c defines an opening (not shown) therein that is able to be brought into alignment with the bore 398d' of sleeve 398d on support arm 324. The spacing between flanges 400c is complementary to the length of sleeve 398d from one side thereof to the other. When the openings in flanges 400c align with bore 398d of sleeve 398, a fastener 402 may be inserted therethrough to secure the L-shaped bracket 400 to sleeve 398 and thereby to isolating system 310. Fastener 402 acts as a pivot rod and a pivot axis "X" (FIG. 27) will extend along the shaft of fastener 402 when inserted through bore 398d' of sleeve 398d. Fasteners 340 are inserted through first openings 312d in mounting bracket 312 to secure isolating system 310 to ceiling "C". Obviously, the L-shaped bracket 400 may be engaged with isolating system 310 before securing the same to the ceiling "C" or after securing the same to the ceiling.

The second leg 400b of the L-shaped bracket 400 defines a plurality of holes 400d therein that extend between an inner surface and outer surface of the second leg 400b. When a user wishes to mount the audio equipment "AE" to the ceiling "C", he or she will secure the L-shaped bracket 400 to the audio equipment "AE" by placing the first leg 400a in abutting contact with the upper surface of the audio equipment and the second leg 400b in abutting contact with the rear surface of the audio equipment. Fasteners 404 (FIG. 30) will be used to secure second leg 400b of L-shaped bracket 400 to the rear surface of the audio equipment. The L-shaped bracket 400 thus secures the audio equipment to the isolating system. The upper isolator assembly 316 bears the entire weight of the audio equipment "AE", the audio equipment is suspended from the upper isolator assembly 316 and has no direct contact with any other part of the isolating system 310 or the ceiling "C".

Referring to FIGS. 25, 27, 28, 29, and 30, it will be understood that if a user wishes to orient the audio equipment differently within an environment, isolating system 310 allows the user to rotate the audio equipment in a horizontal plane (FIG. 29) and/or in a vertical plane (FIG. 30). Mounting bracket 312 fixedly secures the positions of the lower assembly 314 and upper assembly 316 in space. In other words, unlike the previous embodiments, the lower isolator assembly 314 is not able to pivot or move in any fashion relative to the mounting bracket 312. The support arm 324 extending downwardly from upper isolator assembly 316 is configured to enable the user to change the orientation of the audio equipment "AE" in both the horizontal plane and the vertical plane.

The supporting arm 324 enables pivotal motion of the audio equipment "AE" about the vertical axis "Y" in the following manner, shown in FIG. 29. The user will loosen (but not disengage) the nuts of the fasteners 399 which secure the lower plate 398 of the support arm 324 to the upper plate 396 thereof. The user will grasp the audio equipment "AE" if already engaged with the support arm 324 or otherwise will grasp the lower plate 398 and will rotate the lower plate 398 about the vertical axis "Y" in one or the other of a clockwise and counterclockwise direction. This rotational motion will cause the loosened fasteners 399 extending downwardly from upper plate 396 to slide along the arcuate slots 398c defined in the lower plate 398. The rotational motion causes the audio equipment to travel in the horizontal plane from a first location to a second location. When the desired orientation of the audio equipment "AE" is attained, the fasteners 399 will be tightened once again, thereby locking the audio equipment in the selected desired orientation. It will be understood that the number of slots 398c, the curvature of those slots 398c, and the length of the slots 398c will limit the degree of rotational travel of the audio equipment "AE" about the vertical axis "Y". In one embodiment, for example, slots 398c may permit rotation in the horizontal plane through a total of about 30°.

The supporting arm 324 enables pivotal motion of the audio equipment "AE" about the horizontal axis "X" in the following manner, shown in FIG. 30. The user will loosen (but not disengage) the nut on the fastener 402 that extends through sleeve 398d. The user will grasp the audio equipment "AE" and will push or pull the same to rotate the audio equipment "AE" around the horizontal axis "Y", thereby moving the audio equipment through the vertical plane as shown in FIG. 30. When the desired orientation of the audio equipment is attained, the nut on the fastener 402 will be tightened to lock the audio equipment in the selected desired orientation.

It will be understood that while the isolating system described and illustrated herein is disclosed as including two (or four) lower isolators in the lower isolator assembly and two (or four) second isolators in the upper isolator assembly, and two (or four) rods that extend between the isolators, in other embodiments, only one lower isolator, one upper isolator, and one rod may be provided in the lower and upper isolator assemblies, respectively. In yet other embodiments, more than two (or four) lower isolators, more than two (or four) second isolators, and a complementary number of rods or tubes, may be provided in the lower and upper isolator assemblies. It will be understood that the support plate or housing and the associated base plate will be modified to be complementary in configuration to the number of upper and lower isolators provided in the isolator assemblies of the wall mounted isolating system. The number of upper and lower isolators and rods selected for use in the wall mounted isolating system will depend upon the particular application in which the isolating system is to be used and the designed weight capacity the isolating system will be expected to bear in that application.

It will also be understood that while the isolating systems 10, 110, 210, 310 have been disclosed as enabling audio equipment to be secured to a vertical surface such as support surface "SS" or a horizontal surface such as ceiling "C", it will be understood that the isolating systems 210, 110 may, instead, be used to secure the audio equipment to any suitable inclined support surface.

Isolating systems 10, 110, 210, 310 have been disclosed herein as being used to suspend audio equipment therefrom such that the audio equipment hangs downwardly from the isolating system which thereby bears the weight of the audio equipment. In other embodiments the isolating systems 10, 110, 210, 310 may, instead, be installed so that the audio equipment extends upwardly away from the isolating system 10, 110, 210, 310 and the isolating system supports the weight of the audio equipment from below, and keeps the audio equipment a distance vertically above a horizontal support surface.

The lower isolator assembly of isolating systems 10, 110, 210, 310 has been disclosed herein as being pivotally engaged with the respective mounting bracket 12, 112, 212, and 312 via a vertically-oriented fastener, and that fastener forms a vertical pivot axis about which the lower and upper isolator assemblies may pivot in a horizontal plane. It will be understood that in other embodiments, the lower isolating assembly may, instead, be engaged with the respective mounting bracket via a horizontally-oriented fastener which will enable the lower and upper isolator assemblies to pivot in a vertical plane about a horizontal pivot axis that extends along that horizontally-oriented fastener. Similarly, the support arm and/or tilt assembly of the various isolating systems 10, 110, 210, 310 has been disclosed as enabling pivotal engagement of the audio equipment with the upper isolator assembly. It will be understood that in other embodiments, the support arm or the tilt assembly of the upper isolator assembly may be configured to enable the audio equipment to pivot about a vertically oriented pivot axis. In summary, the connection between the lower isolator assembly and mounting bracket comprises one of a vertically-oriented fastener that presents a vertical pivot axis and a horizontally-oriented fastener that presents a horizontal pivot axis. The connection between the upper isolator assembly and the audio equipment then comprises the other of the vertically-oriented fastener that presents a vertical pivot axis and the horizontally-oriented fastener that presents a horizontal pivot axis.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. An isolating system for dampening vibrations to or from audio equipment, said isolating system comprising:
   a lower isolator assembly adapted to be operatively engaged with a support surface;
   an aperture defined in the lower isolator assembly;
   an upper isolator assembly located vertically above the lower isolator assembly;
   a support arm operatively engaged with the upper isolator assembly, wherein the support arm extends downwardly through the aperture in the lower isolator assembly, wherein the support arm is dimensioned relative to the aperture such that there is no contact between the support arm and the lower isolator assembly; and wherein the support arm is adapted to be operatively engaged with the audio equipment and to bear the audio equipment's weight;
   at least one first isolator provided in the lower isolator assembly;
   at least one second isolator provided in the upper isolator assembly;
   wherein the at least one first isolator and the at least one second isolator are fabricated from a vibration-dampening material; and
   at least one connector member extending between the at least one first isolator and the at least second isolator, wherein the at least one connector member is an only point of contact between the lower isolator assembly and the upper isolator assembly.

2. The isolating system according to claim 1, wherein the at least one connector member is of a length sufficient to prevent direct contact between the at least one first isolator and the at least one second isolator.

3. The isolating system according to claim 1, wherein the vibration-dampening material of the at least one first isolator and the at least one second isolator is a resilient material.

4. The isolating system according to claim 1, further comprising a mounting bracket adapted to be secured to the support surface; and wherein the lower isolator assembly is operatively engaged with the mounting bracket.

5. The isolating system according to claim 4, wherein the lower isolator assembly is pivotally secured to the mounting bracket, and wherein the lower isolator assembly and upper isolator assembly are configured to pivot in unison about a pivot axis.

6. The isolating system according to claim 5, wherein the pivot axis is vertically-oriented and the lower isolator assembly, the upper isolator assembly and the audio equipment engaged therewith are pivotable in a horizontal plane about the pivot axis.

7. The isolating system according to claim 1, wherein the upper isolator assembly includes a tilt assembly which is operatively engaged with the support arm and is adapted to tiltably secure the audio equipment to the upper isolator assembly.

8. The isolating system according to claim 7, wherein the tilt assembly includes a tilt axis, and wherein the audio equipment is pivotable relative to the upper isolator assembly about the tilt axis.

9. The isolating system according to claim 8, wherein the tilt axis is horizontally-oriented, and the tilt assembly is operable to pivot the audio equipment in a vertical plane about the tilt axis.

10. The isolating system according to claim 1, wherein the upper isolator assembly is configured to support the audio equipment's weight directly under the lower isolator assembly.

11. The isolating system according to claim 1, wherein the support arm comprises:
    a post having a first end which is operatively engaged with the upper isolator assembly; and
    a plate which extends radially outwardly from the post a distance away from the first end thereof, and wherein the plate is adapted to be operatively engaged with the audio equipment.

12. A method of reducing transfer of vibration between audio equipment and a support surface comprising:
    providing an isolating system having a lower isolator assembly and upper isolator assembly, wherein an only point of contact between the lower isolator assembly and the upper isolator assembly is via a connector member extending between a resilient upper isolator in the upper isolator assembly and a resilient lower isolator in the lower isolator assembly;
    operatively engaging the lower isolator assembly to the support surface;
    operatively engaging the audio equipment to the upper isolator assembly by:
      providing a support arm on the upper isolator assembly;
      defining an aperture in the lower isolator assembly;
      receiving the support arm through the aperture;
      dimensioning the support arm relative to the aperture such that no contact is made between the support arm and the lower isolator assembly when the support arm is received through the aperture;
      securing the audio equipment to the support arm a distance below the lower isolator assembly; and
    dampening vibration to or from the audio equipment with the resilient upper isolator of the upper isolator assembly and the resilient lower isolator of the lower isolator assembly.

13. The method according to claim 12, wherein operatively engaging the lower isolator assembly with the support surface includes engaging the lower isolator assembly to a mounting bracket and securing the mounting bracket to the support surface.

14. The method according to claim 13, wherein engaging the lower isolator assembly to the mounting bracket comprises pivotally connecting the lower isolator assembly to the mounting bracket.

15. The method according to claim 14, further comprising:
    pivoting the lower isolator assembly and the upper isolator assembly in unison about a vertically-oriented pivot axis, and
    moving the audio equipment through a horizontal plane.

16. The method according to claim 12, further comprising:
    engaging a tilt assembly with the upper isolator assembly; and
    pivotally connecting the audio equipment to the tilt assembly.

17. The method according to claim 16, further comprising:
   pivoting the audio equipment about a horizontally-oriented pivot axis; and
   moving the audio equipment through a vertical plane.

18. The method according to claim 12, further comprising:
   suspending the audio equipment from the upper isolator assembly.

19. The method according to claim 12, further comprising:
   connecting the audio equipment to the upper isolator assembly at a location vertically below the lower isolator assembly.

20. The method according to claim 12, wherein the audio equipment has a weight, and the method further comprises:
   bearing the weight of the audio equipment with the upper isolator assembly.

\* \* \* \* \*